(12) United States Patent
Dylewski, II et al.

(10) Patent No.: US 11,865,907 B2
(45) Date of Patent: Jan. 9, 2024

(54) FOLDING COVER ATTACHMENT SYSTEMS

(71) Applicant: Truck Accessories Group, LLC, Elkhart, IN (US)

(72) Inventors: Eugene A. Dylewski, II, Granger, IN (US); Christopher David Mattison, Granger, IN (US); John William Bevis, III, Mishawaka, IN (US); Thomas Augustine Hubbard, South Bend, IN (US)

(73) Assignee: Leer Group, Elkhart, IN (US)

( * ) Notice: Subject to any disclaimer, the term of this patent is extended or adjusted under 35 U.S.C. 154(b) by 0 days.

(21) Appl. No.: 17/946,598

(22) Filed: Sep. 16, 2022

(65) Prior Publication Data

US 2023/0013667 A1    Jan. 19, 2023

Related U.S. Application Data

(63) Continuation of application No. 17/066,742, filed on Oct. 9, 2020, now Pat. No. 11,446,995, which is a continuation of application No. 16/166,474, filed on Oct. 22, 2018, now Pat. No. 10,800,234.

(60) Provisional application No. 62/577,920, filed on Oct. 27, 2017.

(51) Int. Cl.
*B60J 7/19*    (2006.01)
*B60J 7/14*    (2006.01)

(52) U.S. Cl.
CPC ............. *B60J 7/198* (2013.01); *B60J 7/141* (2013.01)

(58) Field of Classification Search
CPC ............................... B60J 17/198; B60J 7/141
See application file for complete search history.

(56) References Cited

U.S. PATENT DOCUMENTS

| | | | | |
|---|---|---|---|---|
| 5,251,950 A | * | 10/1993 | Bernardo | B60J 7/041 296/100.09 |
| 5,275,458 A | * | 1/1994 | Barben | B60J 7/104 296/100.18 |
| 8,205,928 B2 | * | 6/2012 | Steffens | B60J 7/141 292/DIG. 3 |
| 2007/0108792 A1 | * | 5/2007 | Weldy | B60J 7/08 296/100.09 |
| 2009/0146449 A1 | * | 6/2009 | Steffens | B60J 7/141 296/100.07 |
| 2010/0219658 A1 | * | 9/2010 | Steffens | B60J 7/141 24/457 |
| 2016/0096423 A1 | * | 4/2016 | Facchinello | B60J 7/106 292/256 |

(Continued)

*Primary Examiner* — Lori Lyjak
(74) *Attorney, Agent, or Firm* — Barnes & Thornburg LLP

(57) ABSTRACT

A truck that includes a bed section located rear of a cab section where the bed section is bounded on each side by opposing first and second upward-extending side walls, respectively. The truck includes a tonneau cover which has a first panel section pivotable with respect to the opposing first and second upward-extending side walls. A latching assembly is attached to the first panel section that selectively secures and releases the first panel section with respect to the first and second upward-extending side walls of the truck. The latching assembly includes at least one adjustable pinch latch assembly. The pinch latch assembly includes a latch handle portion and a latch base located on the first panel section adjacent the latch handle portion.

19 Claims, 29 Drawing Sheets

(56) References Cited

U.S. PATENT DOCUMENTS

2016/0107515 A1* 4/2016 Shi .................. B60J 7/062
 296/100.18
2016/0114666 A1* 4/2016 Xu .................. B60P 7/02
 296/100.07
2018/0345769 A1* 12/2018 Dylewski, II ........... B60J 7/198

* cited by examiner

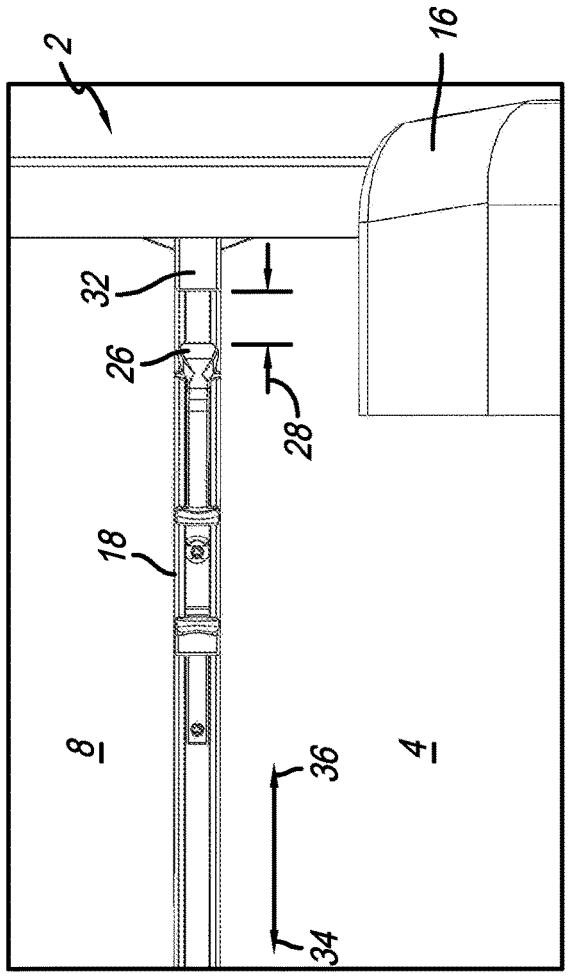
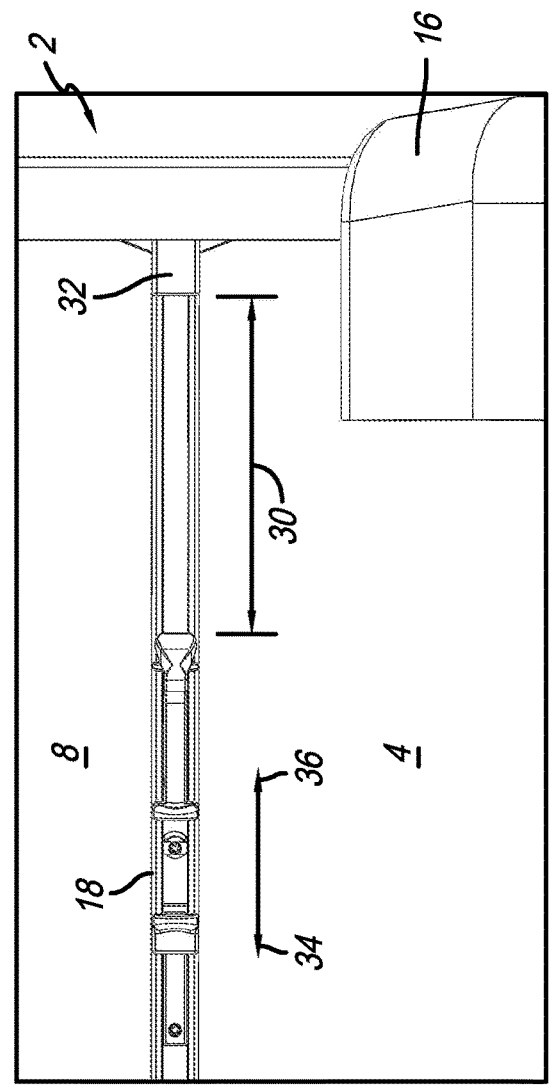
FIG. 3A
FIG. 3B

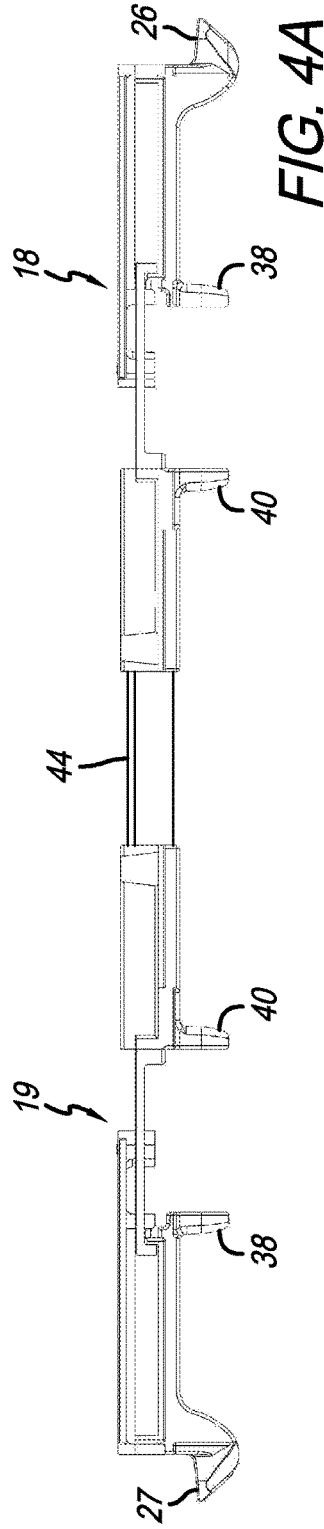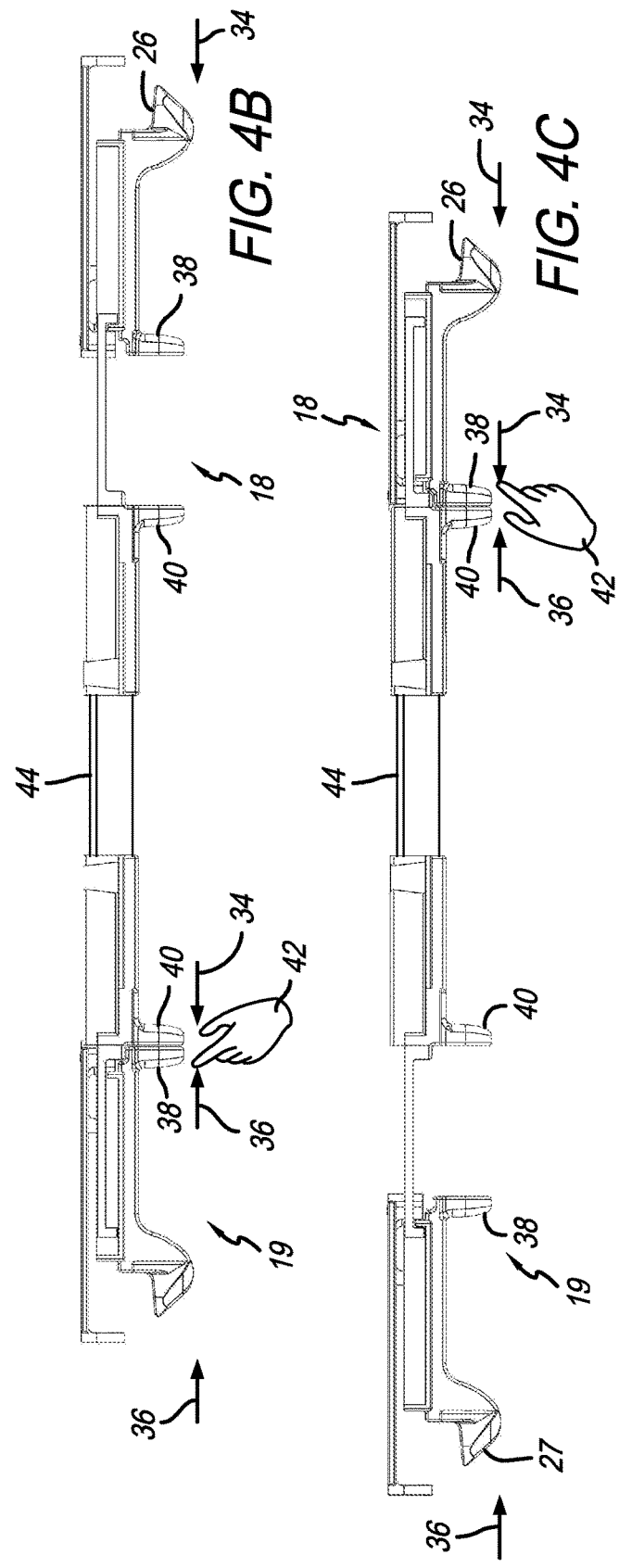

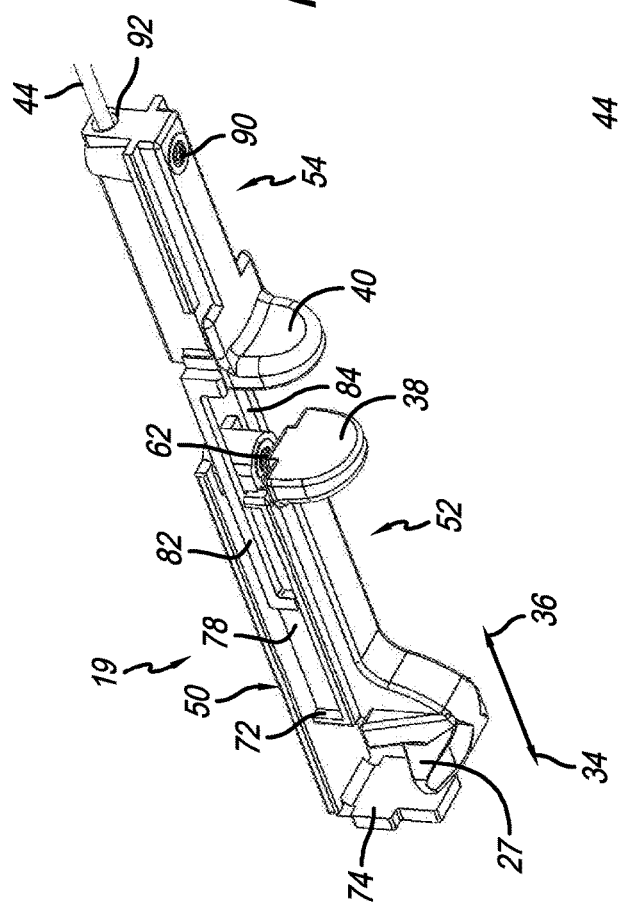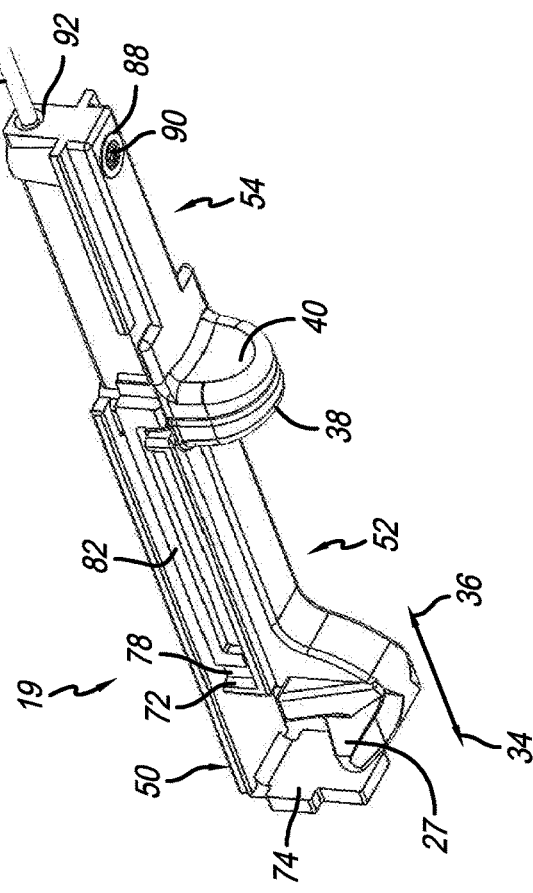

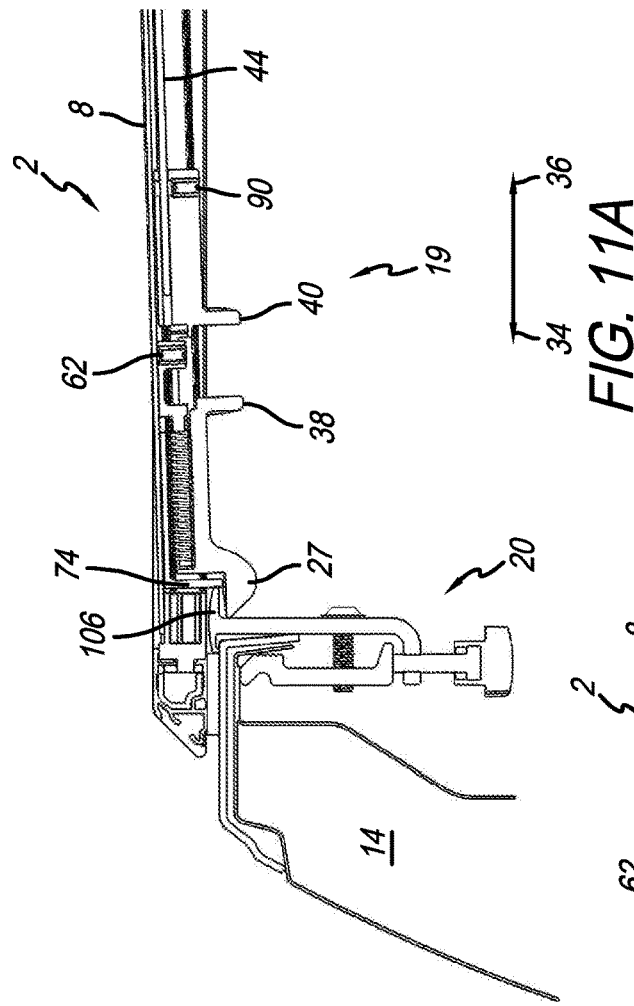
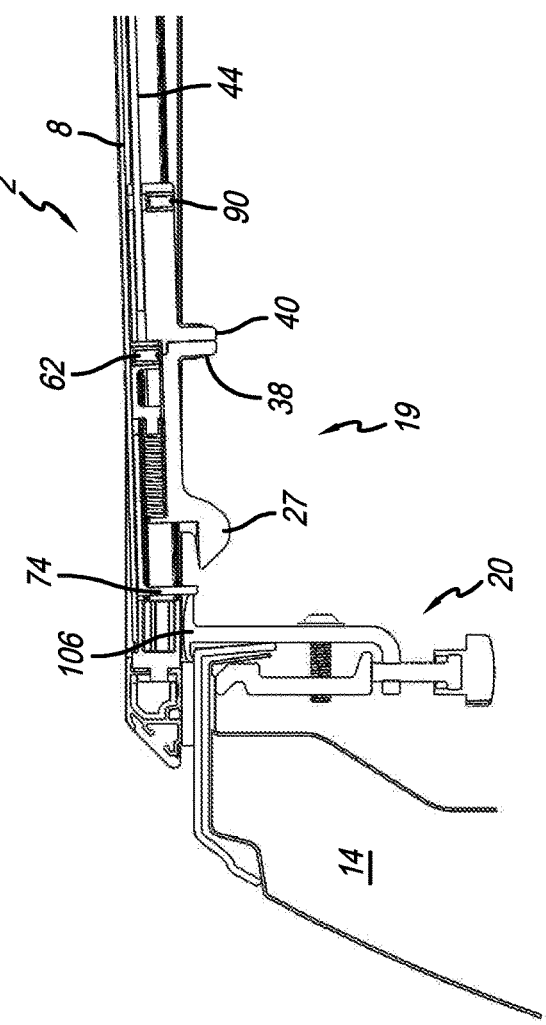

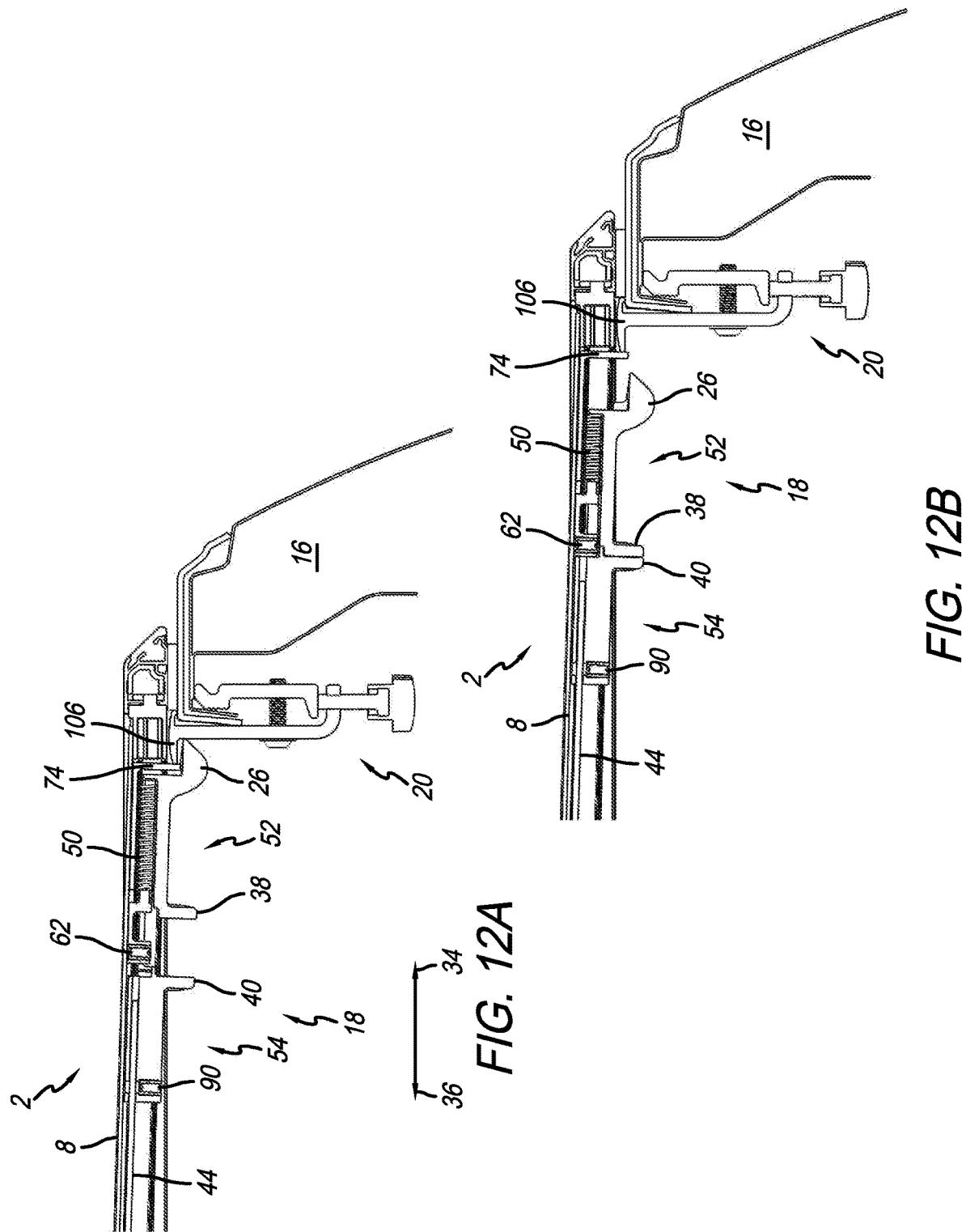

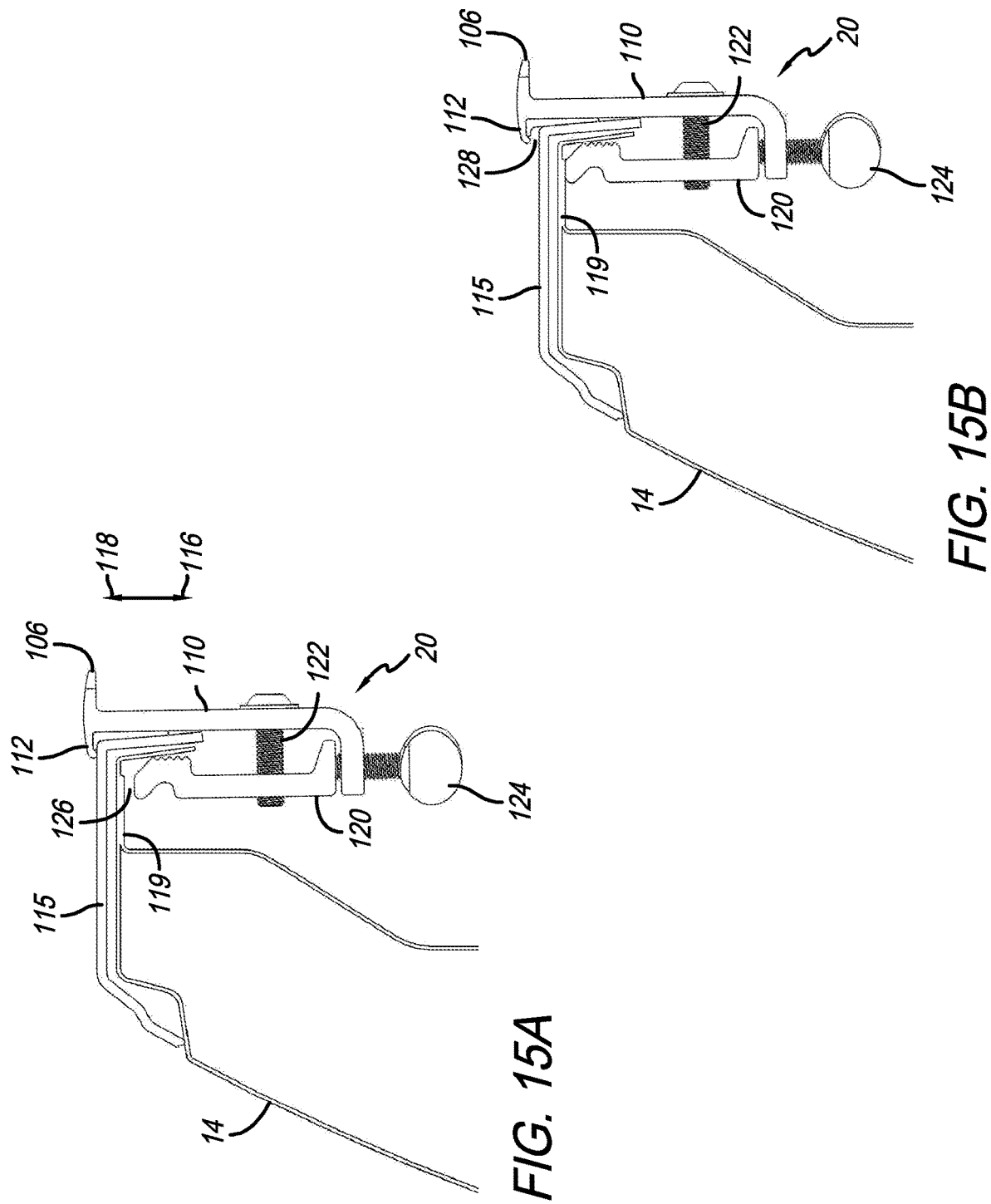

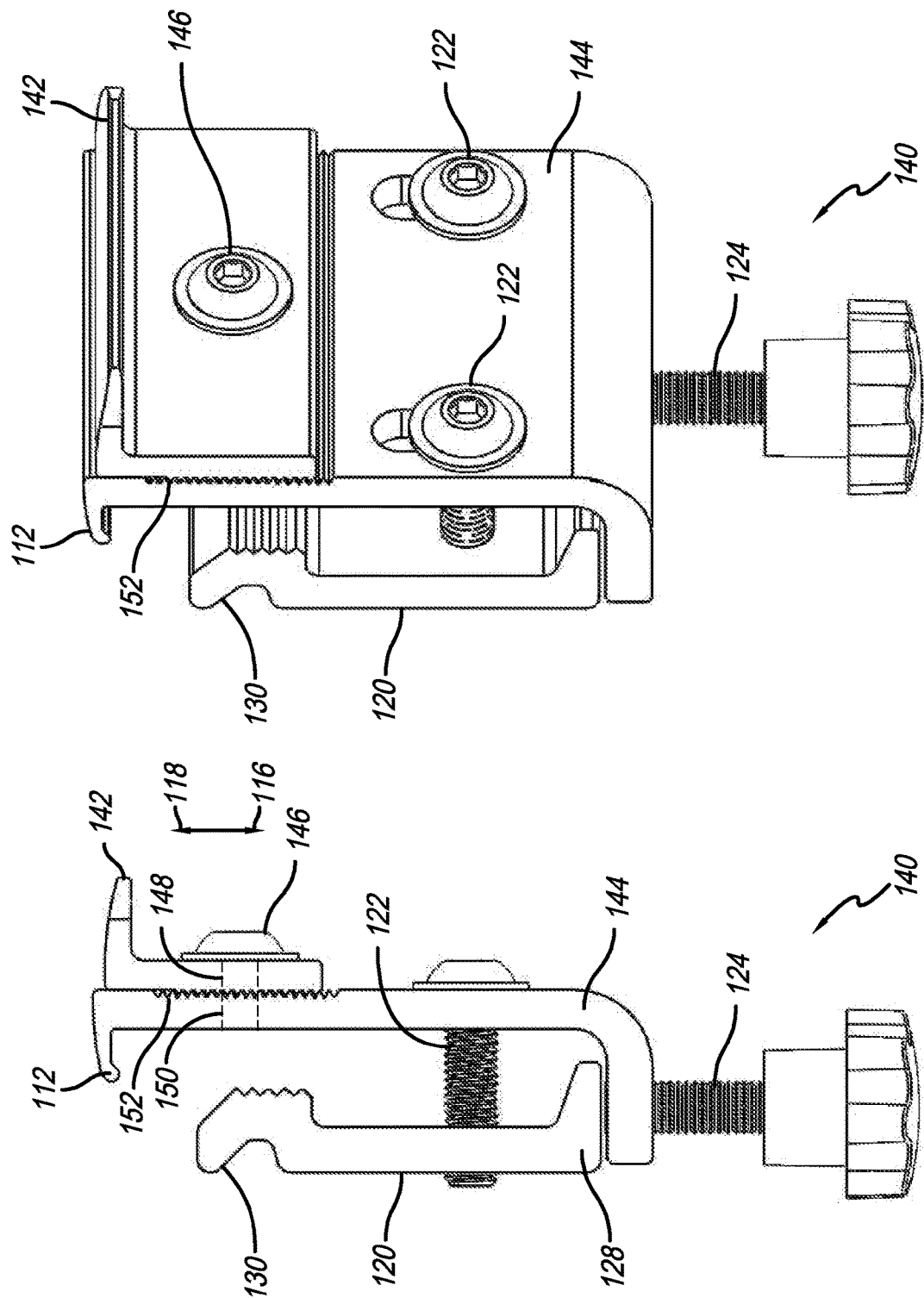

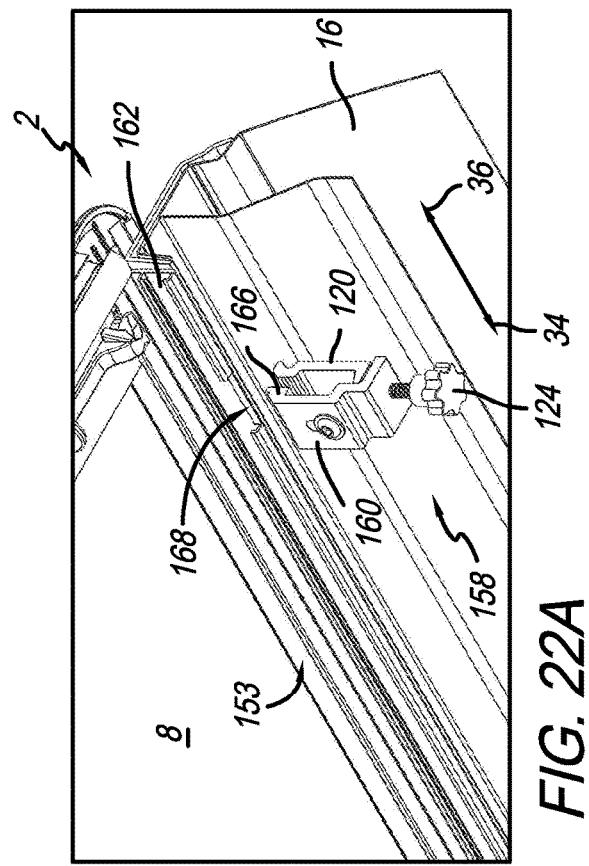
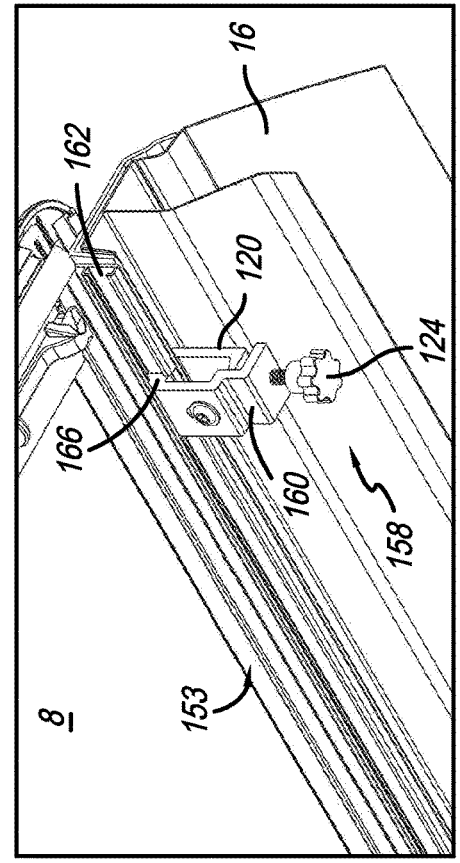

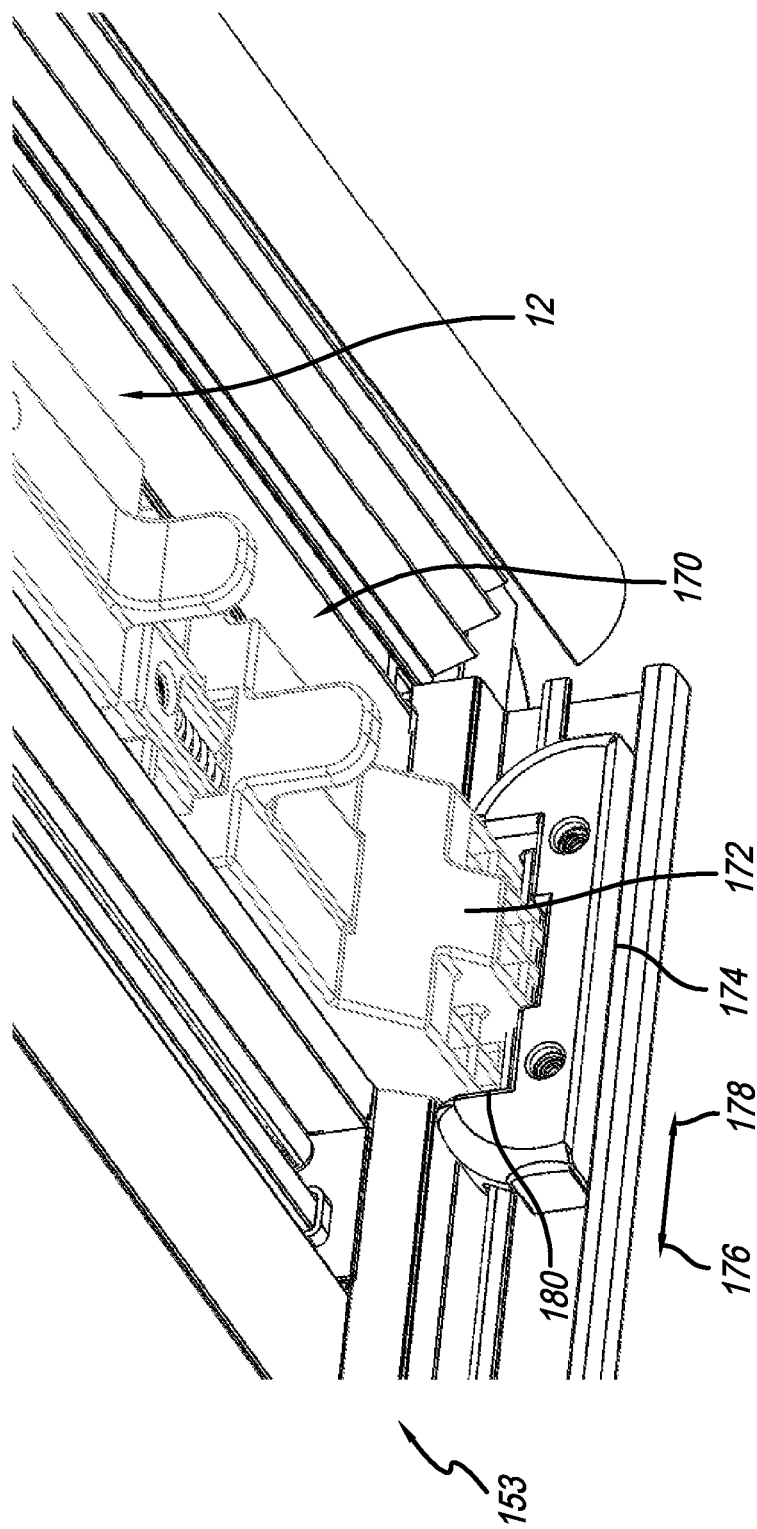

FOLDING COVER ATTACHMENT SYSTEMS

RELATED APPLICATIONS

The present Application is a Continuation Application of U.S. patent application Ser. No. 17/066,742, filed on Oct. 9, 2020, entitled "Folding Cover Attachment Systems," which will be U.S. Pat. No. 11,446,995, and U.S. application Ser. No. 16/166,474, filed on Oct. 22, 2018, entitled "Folding Cover Attachment Systems," now U.S. Pat. No. 10,800,234, and also claims priority to U.S. Provisional Patent Application, Ser. No. 62/577,920, filed on Oct. 27, 2017, entitled "Folding Cover Attachment Systems." The disclosures of those applications are hereby expressly incorporated into the present application by reference.

TECHNICAL FIELD AND SUMMARY

The present disclosure relates to trucks such as pickup trucks, and truck beds used on pickup trucks and like vehicles. In particular, the present disclosure relates to a truck bed cover, also known as a tonneau cover, that includes new structural features used to secure such covers on the truck beds.

Tonneau or truck bed covers provide a covering for a truck bed when used in combination with the truck sidewalls and tailgate. Supported by the bed's sidewalls and suspended over the bed of a pickup truck, the truck bed cover helps create a secure compartment where items may be stored in the bed out of view when the tailgate is up. Embodiments of a tonneau or truck bed cover, according to the present disclosure, may provide any one or more of the features disclosed herein, including but not limited to, an adjustable pinch latch assembly, latch override stop, clamp latch catch, adjustable clamp back, adjustable striker on a clamp, pinch latch rail with clamp, front latch locator, and auto latch.

An illustrative embodiment of the present disclosure provides a truck that includes a bed section located rear of a cab section, wherein the bed section is bounded on each side by opposing first and second upward-extending side walls, respectively. The truck includes a tonneau cover which comprises: a first panel section pivotable with respect to the opposing first and second upward-extending side walls; a latching assembly attached to the first panel section and which selectively secures and releases the first panel section with respect to the first and second upward-extending side walls of the truck; wherein the latching assembly includes at least one adjustable pinch latch assembly; wherein the at least one adjustable pinch latch assembly is located on the first panel section and adjacent the first upward-extending side wall of the truck; wherein the at least one adjustable pinch latch assembly comprises: a latch handle portion; a latch base located on the first panel section adjacent the latch handle portion; and a set member selectively engageable with the latch base and the first panel section. The set member is adjustable so as to selectively secure the latch base onto the first panel section at a plurality of positions on the first panel section. When the latch base is secured to the first panel section the latch base determines the position of the latch handle portion relative to the first upward-extending side wall of the truck.

In the above and other illustrative embodiments, the tonneau cover may further comprise: the plurality of positions on the first panel section being a plurality of linear positions; the set member being a set screw; the latching assembly including a second adjustable pinch latch assembly located on the first panel section and adjacent the second upward-extending side wall of the truck, wherein the second adjustable pinch latch assembly comprises: a latch handle portion, a latch base located on the first panel section adjacent the latch handle portion, a set member selectively engageable with the latch base and the first panel section, wherein the set member is adjustable so as to selectively secure the latch base onto the first panel section at a plurality of positions on the first panel section, and wherein when the latch base is secured to the first panel section the latch base determines the position of the latch handle portion relative to the second upward-extending side wall of the truck; a connector located between and engageable with the at least one adjustable pinch latch assembly and the second adjustable pinch latch assembly, a second set member selectively engageable with the at least one adjustable pinch latch assembly and the connector to selectively secure to a plurality of positions on the first panel section; the at least one adjustable pinch latch assembly including an inner latch handle portion engageable with the latch handle portion to selectively secure to the first panel section to the first upward-extending side wall, wherein a connector is located between and engageable with the at least one adjustable pinch latch assembly and the second adjustable pinch latch assembly, a second set member selectively engageable with the inner latch handle portion of the at least one adjustable pinch latch and the connector to selectively secure to a plurality of positions on the first panel section; the connector located between and engageable with the at least one adjustable pinch latch assembly and the second adjustable pinch latch assembly, a second set member selectively engageable with the second adjustable pinch latch assembly and the connector to selectively secure to a plurality of positions on the first panel section; the second adjustable pinch latch assembly also including an inner latch handle portion engageable with the latch handle portion to selectively secure to the first panel section to the second upward-extending side wall, wherein the connector is located between and engageable with the at least one adjustable pinch latch assembly and the second adjustable pinch latch assembly, a second set member selectively engageable with the inner latch handle portion of the second adjustable pinch latch and the connector to selectively secure to a plurality of positions on the first panel section; the latch base including a stop tab extending therefrom, wherein the stop tab is also located adjacent the first upward-extending side wall of the truck to limit linear movement of the first panel section lateral of the pivotable movement with respect to the first upward-extending side wall; a rail attached to the first upward-extending side wall of the truck by a clamp, wherein the stop tab is engageable with a portion of the clamp to limit linear movement of the first panel section; a rail attached to the first upward-extending side wall of the truck by a clamp, wherein the clamp includes a latch catch that extends from the clamp and is engageable with a latch member that moves with the latch handle portion, wherein the latch member selectively engages the latch catch on the clamp to secure or release the first panel section; and a rail attached to the first upward-extending side wall of the truck by a clamp, wherein the clamp includes a clamp back and clamp base which move toward each other with a portion of the rail located in between to attach the rail to the first upward-extending side wall of the truck, wherein the clamp also includes a catch plate movably attached to the clamp base, wherein the catch plate includes a latch catch that extends from the catch plate and is engageable with a latch member that moves with the latch handle portion to secure or release the first panel section.

Another illustrative embodiment of the present disclosure provides a truck that includes a bed section located rear of a cab section. The bed section is bounded on each side by opposing first and second upward-extending side walls, respectively. The truck includes a tonneau cover which comprises: a first panel section pivotable with respect to the opposing first and second upward-extending side walls; a latching assembly attached to the first panel section that selectively secures and releases the first panel section with respect to the first and second upward-extending side walls of the truck; wherein the latching assembly includes at least one adjustable pinch latch assembly that comprises: a latch handle portion; a latch base located on the first panel section adjacent the latch handle portion; wherein the latch base includes a stop tab extending therefrom, wherein the stop tab is also located adjacent the first upward-extending side wall of the truck to limit linear movement of the first panel section lateral of the pivotable movement with respect to the first upward-extending side wall.

In the above and other illustrative embodiments, the tonneau cover may further comprise: a set member selectively engageable with the latch base and the first panel section, wherein the set member is adjustable so as to selectively secure the latch base onto the first panel section at a plurality of positions on the first panel section, and wherein when the latch base is secured to the first panel section the latch base determines the position of the latch handle portion relative to the first upward-extending side wall of the truck; the set member being a set screw; the latching assembly including a second adjustable pinch latch assembly located on the first panel section and adjacent the second upward-extending side wall of the truck, wherein the second adjustable pinch latch assembly comprises: a latch handle portion, a latch base located on the first panel section adjacent the latch handle portion, a set member selectively engageable with the latch base and the first panel section, wherein the set member is adjustable so as to selectively secure the latch base onto the first panel section at a plurality of positions on the first panel section, and wherein when the latch base is secured to the first panel section the latch base determines the position of the latch handle portion relative to the second upward-extending side wall of the truck; a connector located between and engageable with the at least one adjustable pinch latch assembly and the second adjustable pinch latch assembly, a second set member selectively engageable with the at least one adjustable pinch latch assembly and the connector to selectively secure to a plurality of positions on the first panel section; the at least one adjustable pinch latch assembly including an inner latch handle portion engageable with the latch handle portion to selectively secure to the first panel section to the first upward-extending side wall, wherein a connector is located between and engageable with the at least one adjustable pinch latch assembly and the second adjustable pinch latch assembly, a second set member selectively engageable with the inner latch handle portion of the at least one adjustable pinch latch and the connector to selectively secure to a plurality of positions on the first panel section; the second adjustable pinch latch assembly also including an inner latch handle portion engageable with the latch handle portion to selectively secure to the first panel section to the second upward-extending side wall, a second set member selectively engageable with the inner latch handle portion of the second adjustable pinch latch and the connector to selectively secure to a plurality of positions on the first panel section; and a rail attached to the first upward-extending side wall of the truck by a clamp, wherein the clamp includes a latch catch that extends from the clamp and is engageable with a latch member that moves with the latch handle portion, wherein the latch member selectively engages the latch catch on the clamp to secure or release the first panel section.

Additional features and advantages of the folding cover attachment assemblies will become apparent to those skilled in the art upon consideration of the following detail description of the illustrated embodiments exemplifying carrying out the folding cover attachment assemblies as presently perceived.

BRIEF DESCRIPTION OF DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 3A is a rear detail view of a portion of the truck bed cover and sidewall;

FIG. 3B is another rear detail view of a portion of the truck bed cover and sidewall;

FIG. 4A is a side view of the pinch latch assemblies;

FIG. 4B is another side view of the pinch latch assemblies;

FIG. 4C is another side view of the pinch latch assemblies;

FIG. 6A is a detail perspective view of the pinch latch assembly;

FIG. 6B is another detail perspective view of the pinch latch assembly;

FIG. 11A is a sectional end view of the section of the truck bed cover resting on a sidewall;

FIG. 11B is another sectional end view of the section of the truck bed cover resting on a sidewall;

FIG. 12A is a sectional end view of a section of the truck bed cover resting on an opposite sidewall from that shown in FIGS. 11A and 11B;

FIG. 12B is another sectional end view of a section of the truck bed cover resting on an opposite sidewall from that shown in FIGS. 11A and 11B;

FIG. 15A is an end sectional detail view of the sidewall with the clamp assembly attached thereto;

FIG. 15B is another end sectional detail view of the sidewall with the clamp assembly attached thereto;

FIG. 17A is an end view of the clamp assembly;

FIG. 17B is a perspective view of the clamp assembly;

FIG. 22A is an underside perspective view showing a portion of the truck bed cover and sidewall;

FIG. 22B is another underside perspective view showing a portion of the truck bed cover and sidewall;

FIG. 23 is an underside detail view of a portion of a section with a positive set pinch latch assembly having a positive set pinch latch disposed in a front latch locator installed on the rail;

Figure 1A:
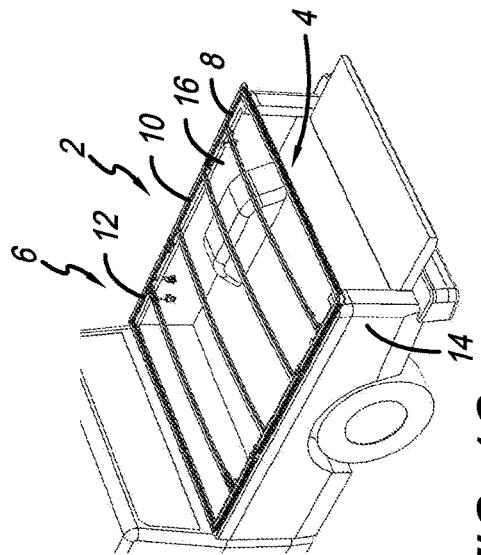
FIG. 1A is an illustrative embodiment of a folding truck bed cover attached to bed of a truck.

Corresponding reference characters indicate corresponding parts throughout the several views. The exemplification set out herein illustrates embodiments of the folding cover attachment assemblies, and such exemplification is not to be construed as limiting the scope of the folding cover attachment assemblies in any manner.

DETAIL DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1B:
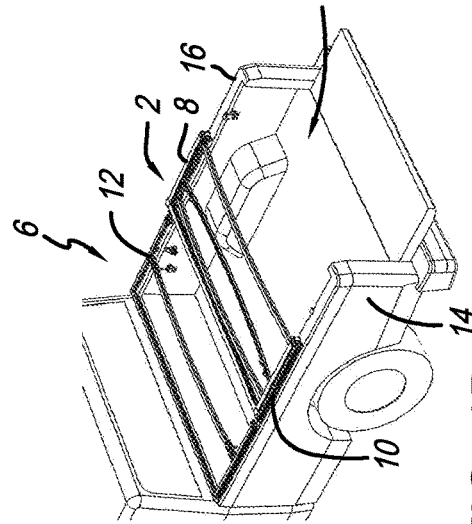
FIG. 1B is another illustrative embodiment of a folding truck bed cover attached to the bed of a truck.
Figure 1C:
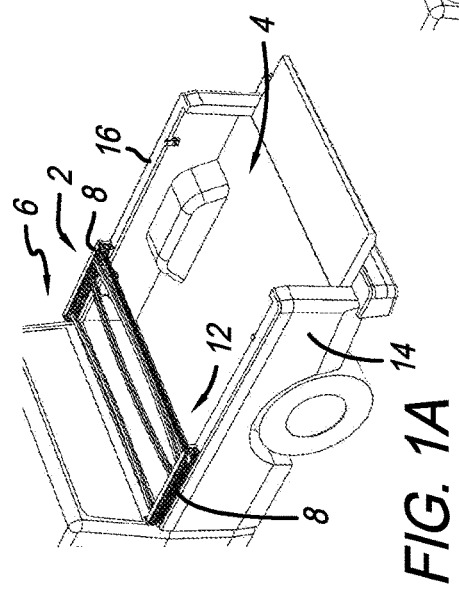
FIG. 1C is still another illustrative embodiment of a folding truck bed cover attached to the bed of a truck.

An illustrative embodiment of a folding truck bed cover 2 attached to truck bed 4 of pickup truck 6 is shown in FIGS. 1A, 1B, and 1C. Truck bed cover 2 shown in these views illustratively includes a vinyl covering that shrouds truck bed 4 concealing it underneath. For purposes of illustrating the structural components of truck bed cover 2, it is shown herein without its vinyl covering material. It is appreciated that truck bed truck bed cover 2 may be made from fabric, plastic, sail cloth, metal, fiberglass, or other like material.

As shown herein, FIG. 1A depicts truck bed cover 2 folded completely in order to allow access into truck bed 4 of pickup truck 6. The view in FIG. 1B differs in that truck bed cover 2 has been partially unfolded to further conceal a portion of truck bed 4. Lastly, shown in FIG. 1C, truck bed cover 2 has been completely folded to cover the entire topside of truck bed 4. Illustratively, truck bed cover 2 includes sections 8, 10, and 12. Section 8 is illustratively foldable with respect to section 10. Section 10 is foldable with respect to section 12. As shown in FIG. 1B, section 8 is folded on top of section 10. As shown in FIG. 1A, both sections 8 and 10 are folded on top of section 12. The various structures disclosed herein are configured to better attach, operate, and latch truck bed cover 2 onto sidewalls 14 and 16 that help define the metes and bounds of truck bed 4.

Figure 2:
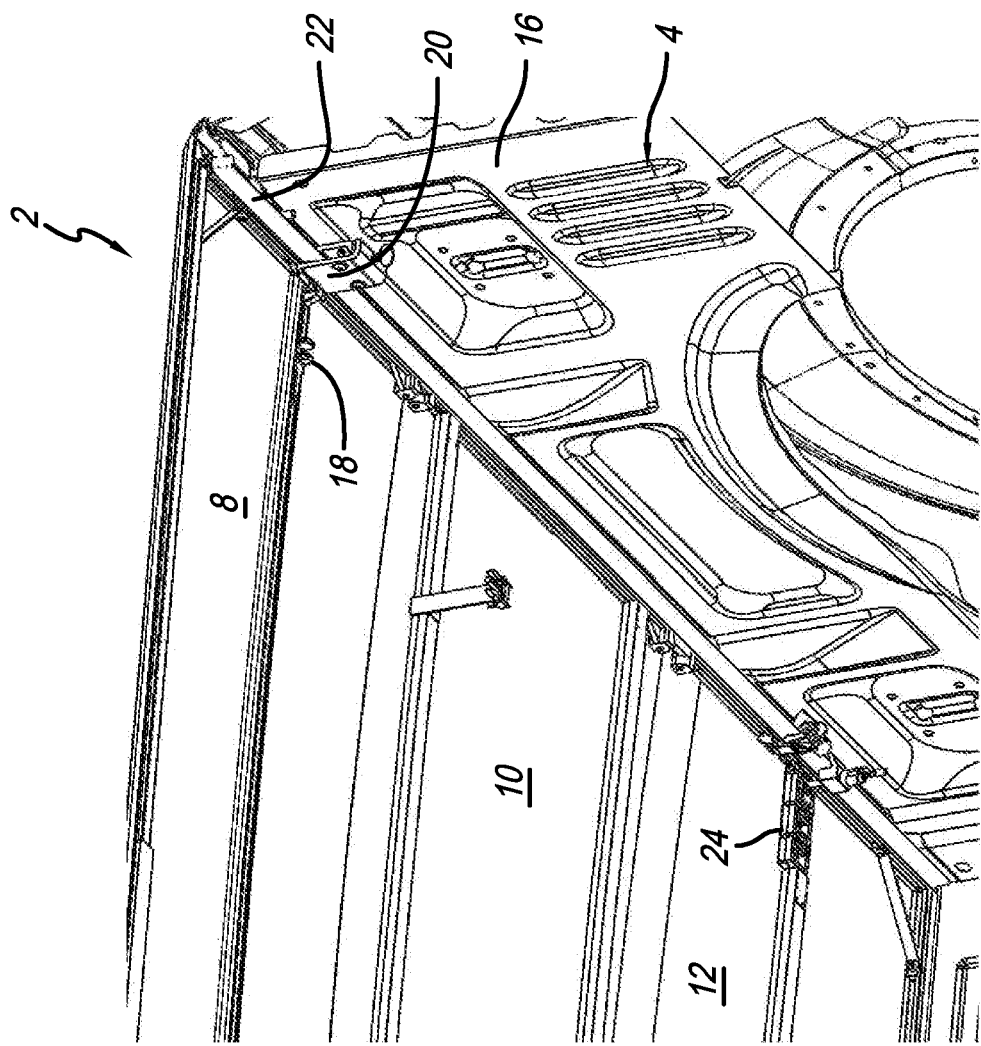
FIG. 2 is an underside upward looking view of a portion of the truck bed with a folding truck bed cover attached thereto.

An underside upward looking view of truck bed 4, with cover to attach thereon, is shown in FIG. 2. Furthering FIGS. 1A, 1B, and 1C, FIG. 2 shows sidewall 16 coupled to truck bed cover 2. This view also shows pinch latch assembly 18 engaged with clamp assembly 20 which is secured to rail 22 of sidewall 16 of truck bed 4. A front clamp assembly 24 positively holds section 12 of truck bed cover 2 onto rail assembly 22. It will be appreciated by the skilled artisan upon reading this disclosure that truck bed cover 2 may include improvements to the latches, clamps, and rails. It will be further appreciated that corresponding structures in FIG. 2 apply to sidewall 14, as well as sidewall 16. One or more of the following improvements may be employed with truck bed cover 2.

Adjustable Pinch Latch Assembly

Truck beds typically come from the manufacturing facility having a standard dimension for the particular make and model. Specifically, the distance between the sidewalls (such as sidewalls 14 and 16 of the present disclosure) are separated by a standard distance both at the cab end of the truck and the tailgate end of the truck. And typically, with those spaces set, truck beds or tonneau covers can be made to standard widths to cover most truck beds. There are instances, however, where the space between the truck bed walls is not at the expected dimension. If a truck bed has been damaged or reworked, or even manufactured out of specification or tolerance, the distance between the two sidewalls may be either wider or narrower than what it would expect to be. These instances make employing standard width truck beds or tonneau covers difficult. Shims may be required if the dimension is too wide. Conversely, components may need to be cut down to fit a dimension that is too narrow.

Accordingly, an illustrative embodiment of the present disclosure provides an adjustable pinch latch assembly. Because the distance between the spaced apart sidewalls may in some instances be wider and in other instances narrower, the latching system that secures the cover to the sidewalls may be adjustable. The latching mechanism may be adjusted wider or narrower to accommodate sidewall spacing that, for whatever reason, is out of tolerance.

Rear detail views of a portion of truck bed cover 2 on sidewall 16 are shown in comparison views of FIGS. 3A and 3B. In particular, pinch latch assembly 18 is shown with latch member 26 a distance 28 from a catch member 32. By comparison (and exaggerated for purposes of clarity), the same view of FIG. 3B shows latch member 26 positioned a distance 30 from catch member 32. It is clear when comparing distance 28 in FIG. 3A with distance 30 in FIG. 3B, how the same pinch latch assembly 18 can be set at different positions linearly in directions 34 and 36 to locate pinch latch assembly 18 in the proper position. And even though the comparison views are exaggerated, the skilled artisan, upon reading this disclosure, will appreciate that in order to ensure latch member 26 properly engages catch member 32 (or other catch structure), latch member 26 may need to be moved in direction 36 if the distance between sidewalls 14 and 16 are a bit wider than expected, or moved in direction 34 if the distance between sidewalls 14 and 16 are narrower than expected. This provides the installer with flexibility to ensure the latches of truck bed cover 2 properly latch the cover onto the bed even when the bed size is out of tolerance.

Pinch latch assemblies having some similar characteristics to those disclosed herein, may be found in U.S. patent application Ser. No. 15/342,407, entitled "Tonneau Cover," filed Nov. 3, 2016; and U.S. patent application Ser. No. 15/454,326, entitled "Tonneau Cover With Prop Rod Assembly," filed Mar. 9, 2017. The disclosure of these applications, as well as their priority documents, is incorporated herein by reference in their entirety. As such, operating adjustable pinch latch assembly 18 shown in the present disclosure is similar to that shown in those applications incorporated by reference.

Side views of pinch latch assemblies 18 and 19 are shown in FIGS. 4A, 4B, and 4C, demonstrating how they operate. As shown in FIG. 4A, for example, both pinch latch assemblies 18 and 19 are located in their extended latched position. This means when the panel sections (8, 10, and 12) are secured in a latched position, that portion of truck bed cover 2 is latched to catch members or other like structures located on the sidewalls (such as sidewalls 14 and 16 of truck bed 4). In this case, latch member 26 of pinch latch assembly 18 is furthest extended in direction 36, while at the same time, latch member 27 of pinch latch assembly 19 is furthest extended in direction 34. And as will be further discussed herein, to move latch members 26 and 27 to an unlatched condition, latch handles 38 and 40 of pinch latch assembly 19 may be drawn together in directions 36 and 34, respectively, by hand 42. This moves latch member 27 in direction 36 as shown (compare FIG. 4A with FIG. 4B). At the same time, and as will be discussed further herein, because connector member 44 operatively connects pinch latch assembly 19 to pinch latch assembly 18, latch member 26 is configured to simultaneously move in direction 34, thereby moving and unlatching it as well. As a result, both latch members 26 and 27 simultaneously unlatch by only pinching latch handles 38 and 40 of pinch latch assembly 19 together as shown.

Conversely, and as shown in FIG. 4C, hand 42 pinches together its latch handles 38 and 40 in directions 34 and 36, respectively. This action moves latch member 26 in direction 34 to its unlatched position. Simultaneously, because of the connection between pinch latch assemblies 18 and 19, via connector member 44, latch member 27 will be moved in direction 36 to its unlatched position as well. Accordingly, and pursuant to the principles also discussed in the incorporated applications, by pinching the latch handles of either pinch latch assemblies 18 or 19 causes both latch members 26 and 27 to move to their unlatched position. This provides a convenient method of latching and unlatching truck bed cover 2 instead of having to engage pinch latch handles of both pinch latch assemblies 18 and 19 at the same time, which would require use of both hands, rather than one hand.

Figure 5:
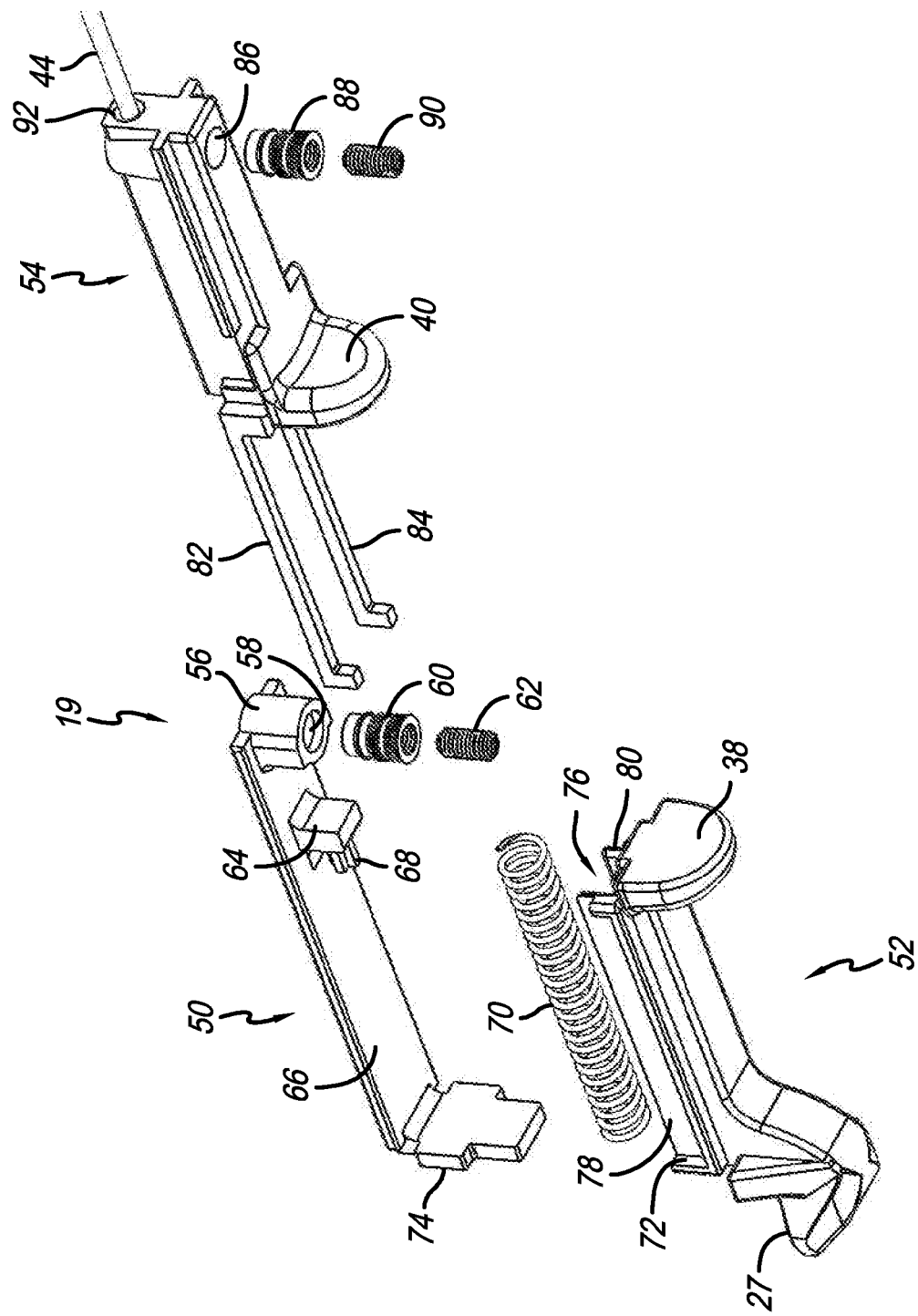
FIG. 5 is an exploded view of the pinch latch assembly.

An exploded view of pinch latch assembly 19 is shown in FIG. 5. It is appreciated that both pinch latch assemblies 18 and 19 are essentially the same except for the orientations of their component structures. For pinch latch assembly 19, it is necessary for latch member 27 to be extending in direction 34 (see FIG. 4A, 4B, 4C), whereas pinch latch assembly 18 has its latch member 26 oriented towards direction 36. In other words, latch member 27 of pinch latch assembly 19 will be directed towards sidewall 14, whereas latch member 26 of pinch latch assembly 18 will be directed towards sidewall 16 (see, also, FIG. 1). As such, the structures herein identified for pinch latch assembly 19 will be the same for pinch latch assembly 18 except their orientations will be reversed. Accordingly, the skilled artisan, upon reading the present disclosure, will appreciate that when describing the component structures of pinch latch assembly 19, the same descriptions apply equally to pinch latch assembly 18 as well. Shown in FIG. 5, pinch latch assembly 19 includes a latch base 50, latch handle portion 52, and latch handle portion 54. With respect to latch base 50, it includes screw set 56 having a bore 58 disposed therethrough configured to receive set screw thread 60 and set screw 62. Set screw thread 60 is configured to fit into bore 58 and provide the threaded surface that receives set screw 62. As such, set screw 62 is configured to dispose through set screw threads 60 and latch base 50 and configured to engage a latch guide 94 (see FIG. 7). In this way, latch base 50 is able to move linearly in directions 34 or 36 to position pinch latch assembly 19 as needed so latch member 27 properly secures truck bed cover 2. A boss 64 extends from panel 66 of latch base 50 and illustratively includes a projection 68 that receives a portion of spring 70. By placing spring 70 between boss 64 of latch base 50 and end 72 of latching portion 52, bias by spring 70 is created in direction 34. This means that unless the bias is overcome illustratively by moving latch handle portion 52 in direction 36, in the case of pinch latch assembly 18, and in direction 34 in the case of pinch latch assembly 19, latch handle portion 52 will bias latch member 27 in direction 34 to the latched position. Additionally, a latch override stop 74 extends from panel 66 of latch base 50 to prevent truck bed cover 2 from being shifted side to side as discussed further herein.

Latch handle portion 52 illustratively includes latch member 27 located opposite latch handle 38. Spring 70 is configured to fit into channel 76 to receive and maintain spring bias from spring 70. Guide channels 78 and 80 are configured to receive guide members 82 and 84, respectively, from latch handle portion 54. Located illustratively opposite guide members 82 and 84 is bore 86 that receives set screw thread 88 and set screw 90. These features operate similar to set screw thread 60 and set screw 62, wherein connector member 44 is disposed through a bore 92 oriented transverse to bore 86. Bore 92 receives connector member 44, which may be extended into or pulled out of latch handle portion 54 to extend or lessen the distance between pinch latch assembly 19 and pinch latch assembly 18. This is how the space between pinch latch assemblies 18 and 19 may be increased or decreased depending on the dimension between sidewalls 14 and 16. Once the proper distance between pinch latch assembly 19 is set from pinch latch assembly 18, set screw 90 is driven through set screw thread 88 and engages connector member 44 to hold same in place relative to pinch latch assembly 18 (see, also, FIG. 8).

Detail perspective views of pinch latch assembly 19 are shown in FIGS. 6A and 6B. These views demonstrate the relative positioning of latch base 50, latch handle portion 52, and latch handle portion 54, when pinch latch assembly 19 is located in latched and unlatched positions. As shown in FIG. 6A, the bias of spring 70 extends latch handle portion 52 in direction 34 such that latch handles 38 and 40 are spaced apart from each other (see FIGS. 11A and 11B). Guide member 82 is fitted in guide channel 78 (as guide member 84 is located in guide channel 80—not shown in these views) to maintain linear-only movement of latch handle portions 52 and 54. As shown in the perspective view of FIG. 6B, latch handles 38 and 40 are pinched together (see, also, FIG. 4*b*) so latch 27 is located in an unlatched position. Here, such movement draws latch handle portions 52 and 54 toward each other so latch handles 38 and 40 become adjacent to each other. This movement requires enough force to overcome the bias of spring 70 in direction 34. Hence latch handle portion 52 is drawn in direction 36. Conversely, latch handle portion 54 is moveable in direction 34. Because connector member 44 is attached to latch handle portion 54 of both pinch latch assembly 18 and pinch latch assembly 19, moving latch handle portion 54 in direction 34, connector member 44 attached to latch handle portion 54 of pinch latch assembly 18 causes that pinch latch handle portion to also move in direction 34. Because of guide members 82 and 84, they will pull on latch handle portion 52 of pinch latch assembly 18 to pull latch member 26 in direction 34 as well. The net effect is that latch handle portion 52 of pinch latch assembly 19 is pulling latch member 27 in direction 36 to its unlatched position. Latch handle portion 54 of pinch latch assembly 19 is pulling latch handle portion 54 of pinch latch assembly 18 in direction 34, which is causing latch member 26 to move to its unlatched position simultaneously.

Figure 7:
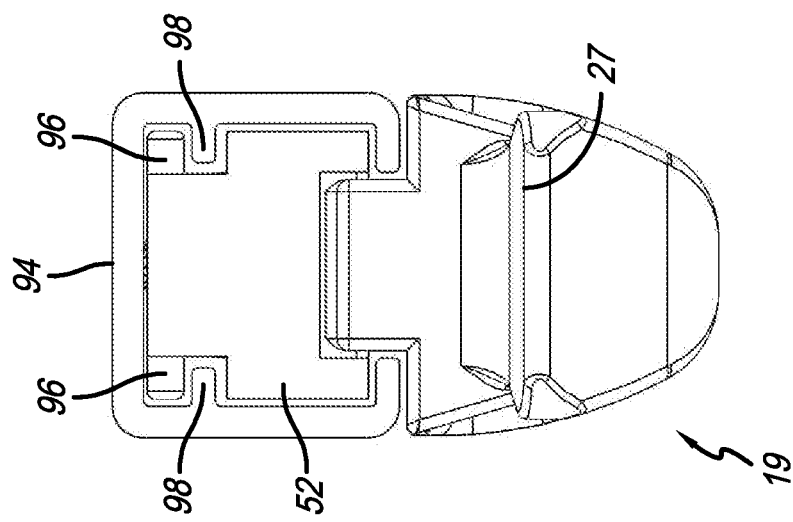
FIG. 7 is an end view of the pinch latch assembly located in a latch guide.

An end view of pinch latch assembly 19 located in latch guide 94, is shown in FIG. 7. It is appreciated that latch handle portion 52 and 54 (see, also, FIG. 8) includes a bearing surface 96 configured to run along rail portions 98 of latch guide 94. It is appreciated that latch guide 94 may extend underneath section 8 of truck bed cover 2 (see FIG. 1*c* and FIG. 2) with the components of pinch latch assemblies 18 and 19 allowed to move along through latch guide 94.

Figure 8:
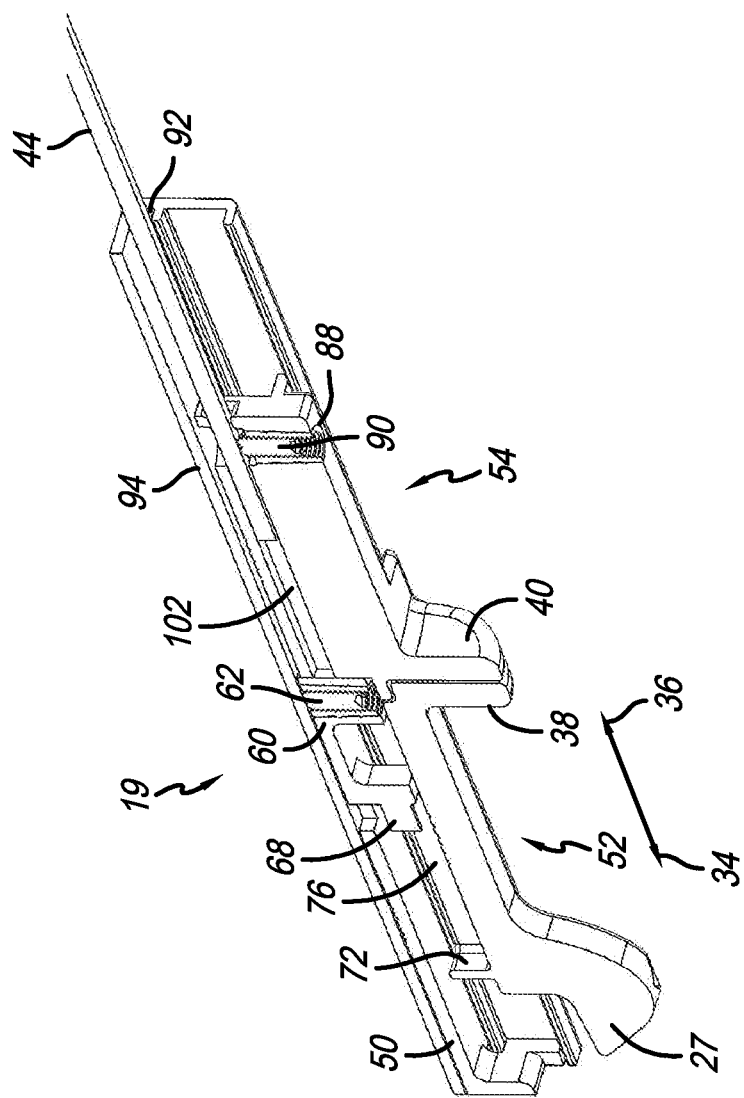
FIG. 8 is a perspective longitudinal cross-section view of the pinch latch assembly located in the latch guide.

A perspective longitudinal cross-section view of pinch latch assembly 19 located in latch guide 94 is shown FIG. 8. It is appreciated that latch guide 94 may extend from one side of panel section 12 of truck bed cover 2 to the other, or only extend a portion of same as shown herein. In either case, this view demonstrates how set screws 62 and 90 engage latch guide 94 and connector member 44, respectively, to adjust positioning of pinch latch assembly 19. It is appreciated that the same structural arrangement and function as described herein with respect to pinch latch assembly 19 applies to pinch latch assembly 18 located distal from pinch latch assembly 19. As shown herein, with latch handles 38 and 40 abutting each other, latch member 27 is located in the unlatched position. Set screw 62 may be loosened with respect to latch guide 94 to allow pinch latch assembly 19 to be moved in either direction 34 or 36, depending upon whether the span between pinch latch assemblies 18 and 19 needs to be expanded or contracted. If expanded, pinch latch assembly 19 may be moved in direction 34 and set screw 62 re-tightened onto latch guide 94 (illustratively on bearing surface 96), to keep pinch latch assembly 19 located in that position. At the same time, pinch latch assembly 19 is adjustable with respect to pinch latch assembly 18 by loosening set screw 90 and moving connector member 44 in cavity 102 in latch handle portion 54. Once the desired spacing between pinch latch assemblies 18 and 19 are reached, set screw 90 may be tightened against connector member 44 so that, as latch handle portion 54 moves in direction 34 or 36, so too does latch handle portion 54 of pinch latch assembly 18. This view also shows channel 76 spanning between end 72 of latch handle portion 52 and projection 68 on boss 64 of latch base 50.

Figure 9B:
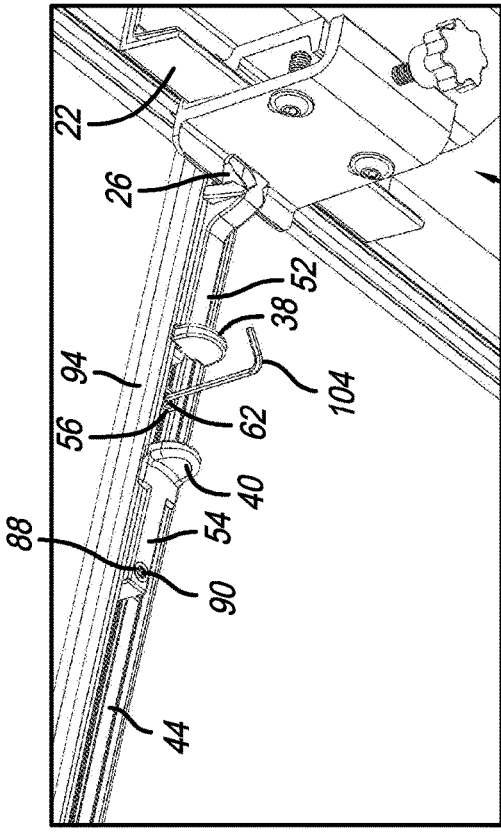
FIG. 9B is another underside perspective detail view of the pinch latch assembly being adjusted.
Figure 9A:
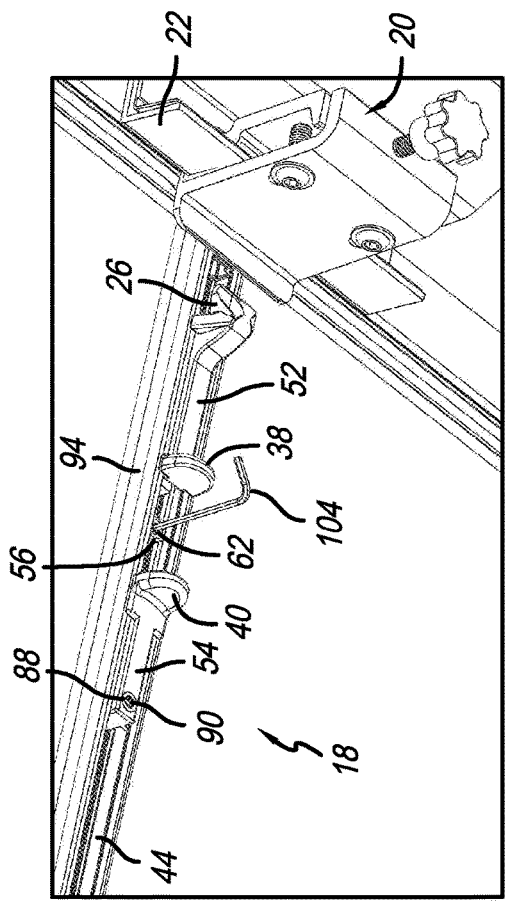
FIG. 9A is an underside perspective detail view of the pinch latch assembly being adjusted.

Underside perspective detail views of pinch latch assembly 18 (or pinch latch assembly 19) being adjusted by a wrench 104 are shown in FIGS. 9A and 9B. As shown, wrench 104, such as an Allen wrench, may rotate to loosen set screw 62 in screw set 56 of latch handle portion 54. Once loosened, pinch latch handle assembly 18 may be moved along latch guide 94 in direction 36 as shown in FIG. 9B until latch member 26 engages catch 106 of clamp assembly 20. With latch handles 38 and 40 spaced apart as shown, this means latch member 26 should be in a latched position. This is why pinch latch assembly 18 is moved in direction 36 so that it engages catch 106 of clamp assembly 20 which connotes the latched position. This correctly sets pinch latch assembly 18 in the proper position for latching and unlatching.

Figure 9C:
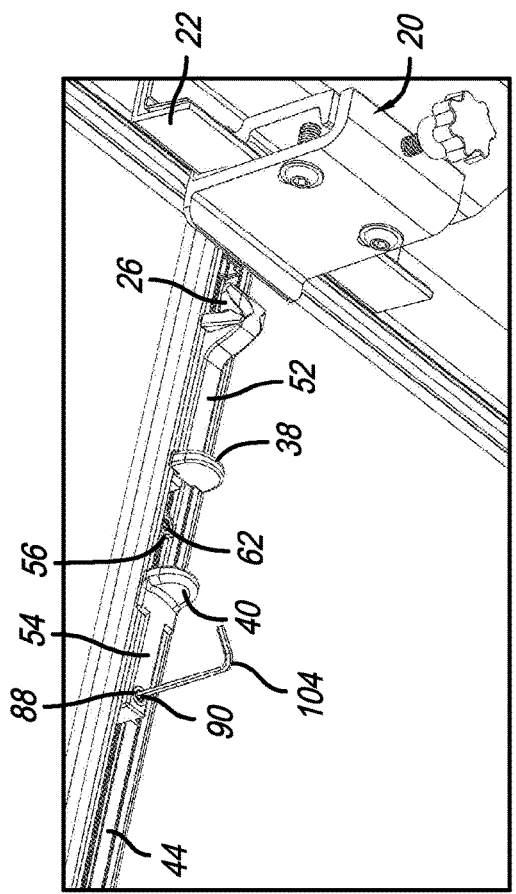
FIG. 9C is another underside perspective detail view of the pinch latch assembly being adjusted.
Figure 9D:
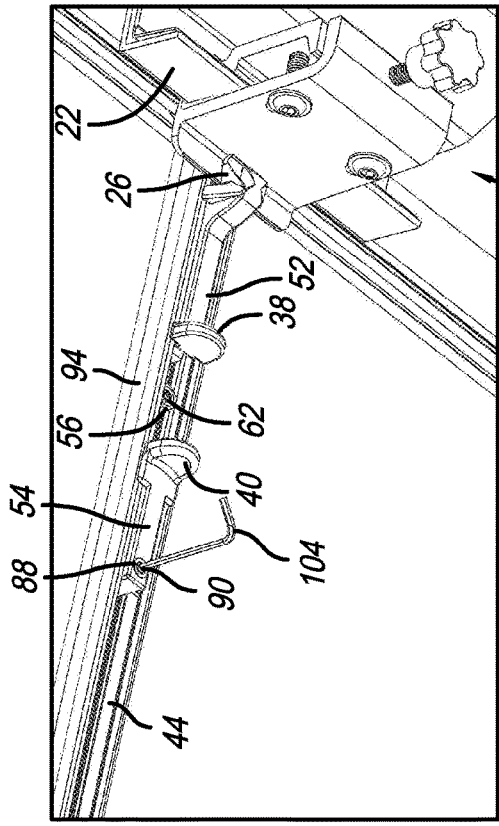
FIG. 9D is another underside perspective detail view of the pinch latch assembly being adjusted.

Further adjustability of pinch latch assembly 18 (or pinch latch assembly 19) is shown in FIGS. 9C and 9D. Here, wrench 104 loosens set screw 90 disposed in threads 88, and bore 86 of latch handle portion 54. Once this happens, latch handle portion 54 is movable in latch guide 94 with respect to connector member 44. As shown in FIG. 9C, latch member 26 engages catch 106 meaning latch member 26 is in its latched position. As such, pinch latch assembly 19 may be moved in direction 34 with connector member 44 until its latch member 27 is also located in its latched position. At this point, wrench 104 may rotate on set screw 90 until same engages latch guide 94 (see, also, FIG. 8 as described with respect to pinch latch assembly 19) to make sure latch member 26 of pinch latch assembly 19 is located in its latched position at the same time latch member 26 is located in its latched position. This means that when latch handles 38 and 40 are pinched together, as previously described herein, as well as the incorporated references, not only will latch member 26 be moved to its unlatched position, but so too will latch member 27.

Another illustrative embodiment of the present disclosure provides for a security feature that prevents a tonneau cover to be movable relative to the cover's latches. As demonstrated in prior figures herein, pinch latch assemblies 18 and 19 extend below section 8 of truck bed cover 2. Particularly, truck bed cover 2 sits on top of sidewalls 14 and 16 of truck bed 4 while pinch latch assemblies extend below truck bed 4, engaging structures attached to sidewalls 14 and 16. Because of this arrangement, it is the bias created by spring 70 in pinch latch assemblies 18 and 19 pushing respective latch members 26 and 27 to their latched positions. This means that it might be possible to push section 8 of truck bed cover 2 laterally with respect to truck bed 4 in either direction 34 or 36 to move section 8. If the force applied to section 8 is greater than the bias force of one of springs 70, then it is conceivable that section 8 may be pushed far enough in either direction 34 or 36 to allow one of the latch members 26 or 27 to disengage from its catch (such as catch 106) and possibly lift a portion of section 12 upward and allow access to truck bed 4 underneath truck bed cover 2.

Accordingly, an illustrative embodiment of the present disclosure provides a latch override stop such as latch override stop 74, first introduced in FIG. 5, and located adjacent to a catch member to inhibit section 12 (or other section that may employ pinch latch assembly similar to either pinch latch assembly 18 or 19) from moving laterally in either directions 34 or 36 to unlatch one of the latch members.

Figure 10:
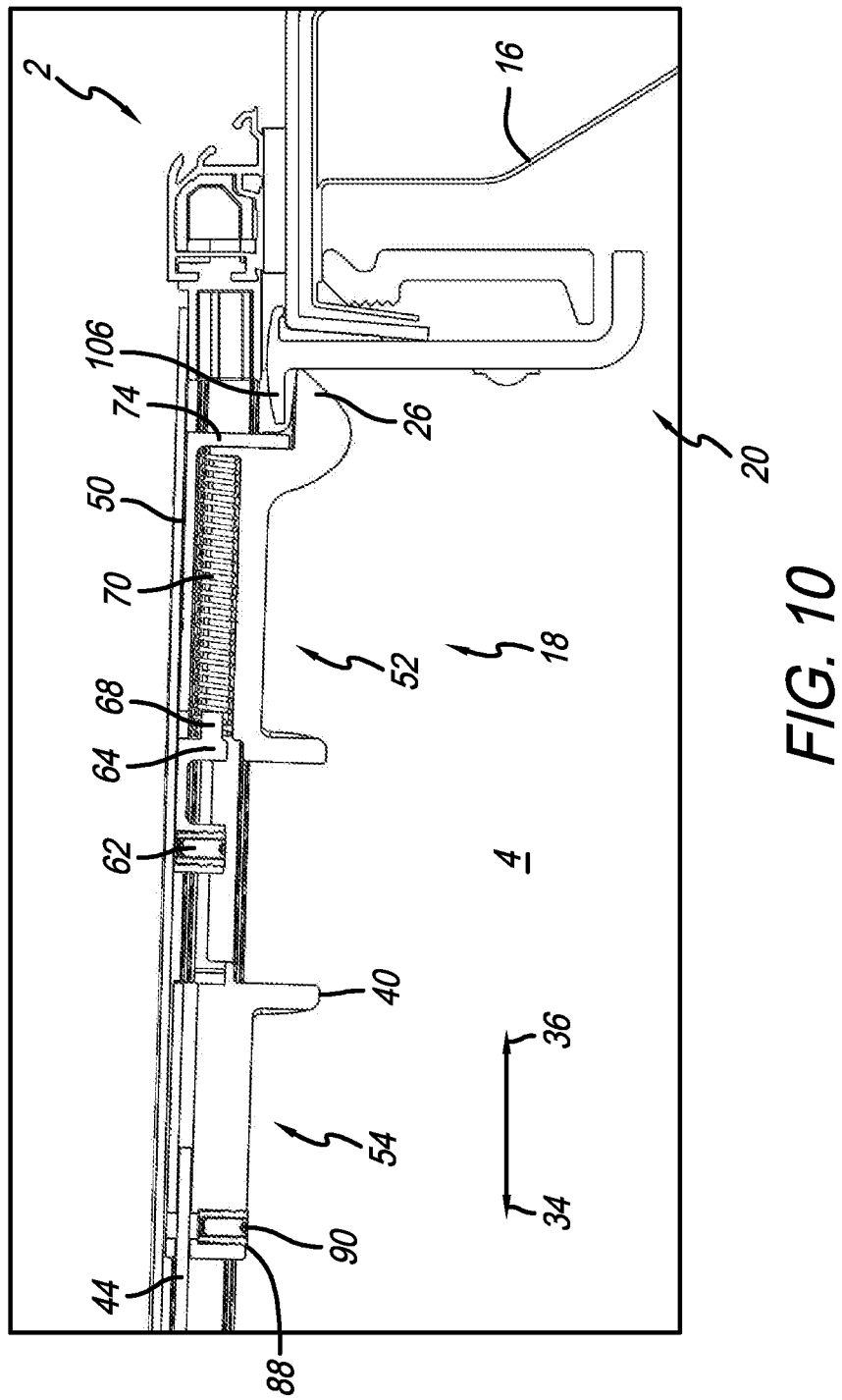
FIG. 10 is a detail cross-sectional view of the pinch latch assembly with a latch override stop located on a latch base located adjacent a catch.

A detail cross-sectional view of pinch latch assembly 18, with latch override stop 74 on latch base 50 adjacent catch 106 is shown in FIG. 10. Here, catch 106, as part of clamp assembly 20, extends in direction 34 opposite latch member 26 of latch handle portion 52, which extends in direction 36. As shown herein, latch member 26 is positioned below catch 106 so that, unless moved against the bias of spring 70 in direction 34 to clear latch number 26 from being underneath catch 106, section 8 of truck bed cover 2 cannot be lifted and section 8 cannot be raised. That said, if the entire section 8 is moved in direction 34, because latch member 27 of pinch latch assembly 19 is connected to pinch latch assembly 18, pushing in direction 34 will cause spring 70 to compress, which will have the effect of reducing the distance between latch member 26 and latch member 27. Because the distance will be reduced (by the amount spring 70 is compressed in pinch latch assembly 18), latch member 26 may move with section 12 enough so that latch member 26 is no longer fitted underneath catch 106. In this instance, this portion of section 12 adjacent latch member 26 could be lifted upward to allow access into truck bed 4 between truck bed cover 2 and sidewall 16. By providing latch override stop 74, adjacent catch 106 on each side of section 8, truck bed cover 2's ability to move laterally in directions 34 or 36 is substantially impaired. Regardless of whether latch members 26 or 27 are located in their latched or unlatched position, latch override stop 74 on each of pinch latch assemblies 18 and 19 are located adjacent to corresponding catches 106 on sidewalls 14 and 16 to prevent lateral movement of truck bed cover.

A sectional end view showing section 12 of truck bed cover 2 resting on sidewall 14 is shown in FIGS. 11A and 11B. This view also shows pinch latch assembly 19. As shown in FIG. 11A, latch member 27 is located in the latched position such that it is located underneath catch 106 of clamp assembly 20. Here, latch override stop 74 is located adjacent to catch 106 while latch member 27 is in this latched position. And when compared to FIG. 12A where pinch latch assembly 18 (similar to FIG. 10) includes latch override stop 74 located adjacent to catch 106 of clamp assembly 20, the skilled artisan will appreciate that section 12 of truck bed cover 2 is not movable in either directions 34 or 36 because latch override stop 74 on both pinch latch assemblies 18 and 19 will abut corresponding catches 106 on clamp assemblies 20 attached respectively on sidewalls 14 and 16. Even under circumstances where either latch member 27 or 26 are located in their unlatched positions, both latch override stop 74 from both pinch latch assemblies 18 and 19 remain adjacent to their respective catches 106 on sidewalls 14 and 16, respectively. It is also appreciated from these views that latch override stop 74 is independently adjustable on each of pinch latch assemblies 18 and 19 to ensure that they are always located adjacent to their corresponding catch on sidewalls 14 and 16. As first identified in FIG. 5, latch override stop 74 extends from latch base 50, which includes its own set screw 62, which selectively engages latch guide 94 once in the desired position. Latch member 27 from pinch latch assembly 19 (or latch member 26 of pinch latch assembly 18, for that matter) will have a consistent range of movement with respect to latch override stop 74 such that if same is located adjacent to catch 106 as shown in FIGS. 11A, 11B, 12A, 12B, either latch member 27 or 26 will be movable to either latched or unlatched positions with respect to catches 106, respectively. This is why, in these illustrative embodiments of pinch latch assemblies 18 and 19, independent setting and locking of latch handle portions 52 and 54 are employed. Latch base 50 with latch override stop 74 defines the position of latch 27 with respect to catch 106. Set screw 90 disposed through latch handle portion 54 of pinch latch assembly 19 independently sets the positioning of pinch latch assembly 18 (and therefore the position of latch member 26 of pinch latch assembly 18) independently with respect to pinch latch assembly 19. In other words, set screw 62, set latch member 27 (or 26, for that matter) with respect to catch 106, whereas set screw 90 of pinch latch assembly 19 independently sets the position between it and pinch latch assembly 18.

When the truck bed cover 2 is installed on truck bed 4 as shown in FIG. 10 and a force is applied to the truck bed cover 2 in direction 34 then the latch override stop 74 on the opposite side of the cover as shown in FIG. 11A will press against catch 106 in FIG. 11A and prevent the cover from shifting in direction 34. The same is true for the reverse scenario when a force is applied in direction 36. Without the latch override stop 74 truck bed cover 2 would move unimpeded in direction 34 until latch member 26 in FIG. 10 is no longer engaged with catch 106 in FIG. 10. At this point truck bed cover 2 could move in direction 34. This may lead to an unintentional or unauthorized opening of the truck bed cover 2. The same is true for the inverse scenario when a force is applied in direction 36 with no override stop.

Clamp Assembly

Another illustrative embodiment of the present disclosure provides for various improvements to clamp assembly 20 that attaches rail assembly 22 to a sidewall of the truck bed. In illustrative embodiments disclosed herein, clamp assembly 20 may include one or more of the following features—catch structure for the pinch latch assemblies, multi-directional clamping structures, and an adjustable catch plate.

Figure 13:
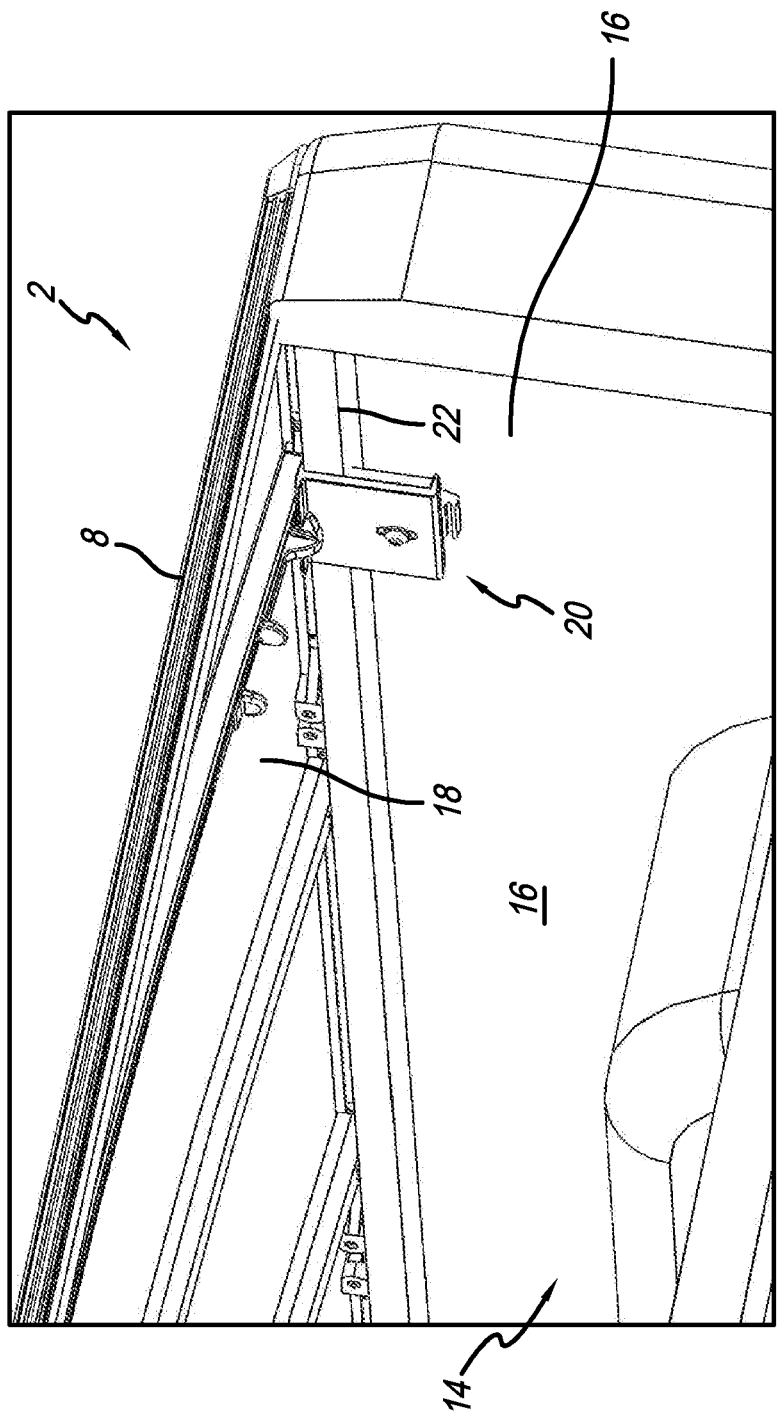
FIG. 13 is a rear detail perspective view of the portion of the truck bed cover and truck sidewall.

The rear perspective detail view of truck bed 4 of FIG. 13 illustratively includes clamp assembly 20 coupled to rail assembly 22 which is located on sidewall 16. Pinch latch assembly 18 is latched onto clamp assembly 20 securing truck bed cover 2 onto sidewall 16. It is appreciated, albeit not shown in this view that a clamp assembly 20 may secure a rail assembly 22 onto the opposed sidewall 14 where pinch latch assembly 19 may secure onto clamp assembly 20 to secure truck bed cover 2 onto sidewall 14 as well.

Figure 14:
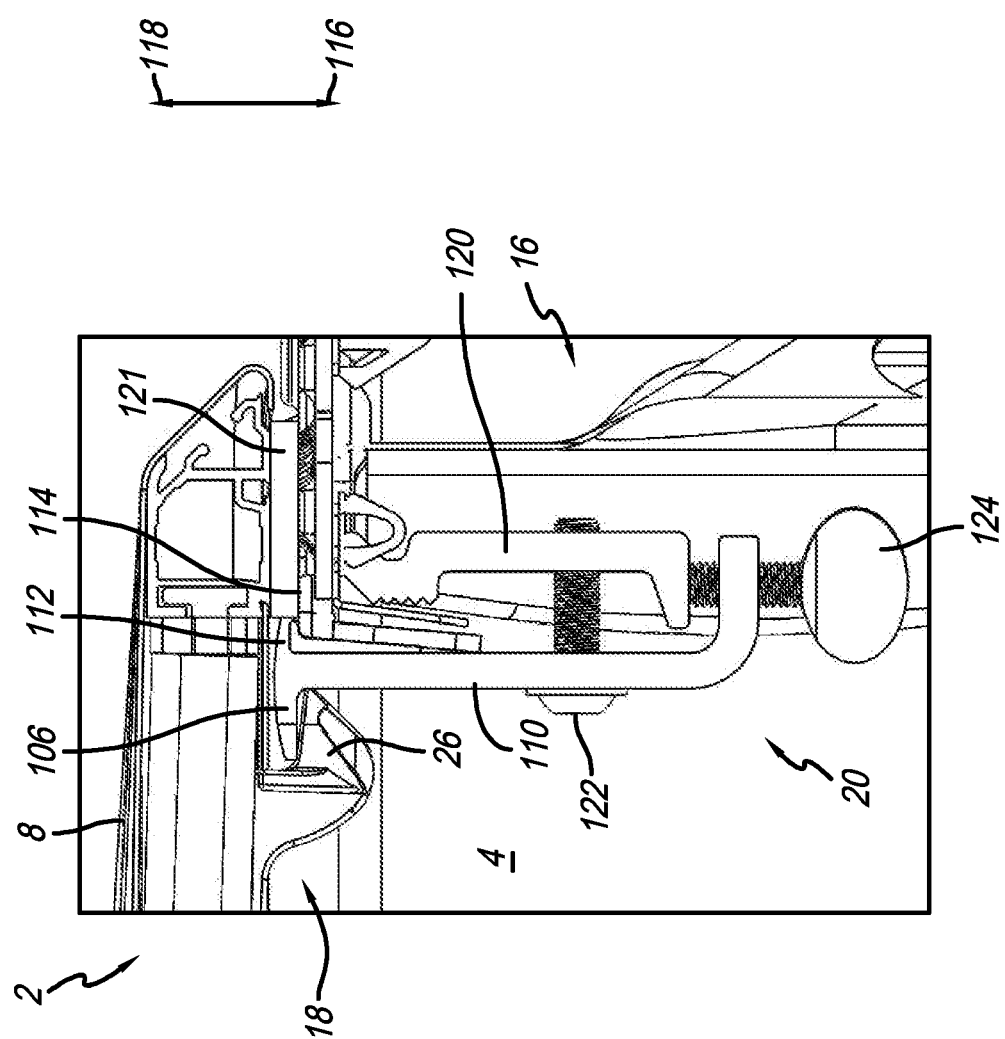
FIG. 14 is an end sectional detail view of the truck bed cover resting on the sidewall with a latch member engaging a catch attached to the clamp assembly.

An end sectional detail view of truck bed cover 2 resting on sidewall 16 with latch member 26 engaging catch 106 being attached to clamp assembly 20 is shown in FIG. 14. Here, catch 106 extends outwardly transverse from clamp base 110 into truck bed 4. Catch 106, as previously identified with respect to pinch latch assemblies 18 and 19 is configured to engage a latch member, such as latch member 26 shown herein. It is appreciated that such a catch 106 is likewise engageable with latch member 27 on pinch latch assembly 19 on clamp assembly 20 attached to sidewall 14. Also shown in this view is a return flange 112 extending opposite catch 106 and configured to engage top surface 114 of a truck bed sidewall such as sidewall 16. Return flange 112 prevents any downward movement of clamp assembly 20 in direction 116. When truck bed cover 2—particularly section 8—is moved to its closed position and either pinch latch assembly 18 or 19 begins to engage catch 106, a downward force may be exerted onto clamp assembly 20. This downward force in direction 116 may cause clamp assembly 20 to move downward as well, preventing proper engagement between the latch member and the catch. This may even result in the latch member being able to latch onto catch 106. Return flange 112 prevents such movement to interfere with proper latching between the latch member and catch 106. Additional structures that may further make up clamp assembly 20 are clamp back 120, clamping screw 122 and adjustment screw 124.

Another issue with truck bed cover clamps is that they tend to have limited adjustability to properly fit onto the myriad of truck bed wall designs. With the different pickup truck manufacturers, they all have different sizes, configurations, thicknesses of sidewall materials and form. A clamp designed to fit a truck bed sidewall of particular design from one manufacturer may not be suitable for a truck bed sidewall design from another manufacturer.

As shown in the end cross-sectional view of sidewall 14 of FIGS. 15A and 15B, clamping onto same may produce a gap between the top of the interior side of the clamp as represented by reference number 126. Or, the clamp may create a gap between top surface 115 of sidewall 16 (the same may apply to sidewall 14 as well) and the catch surface of the clamp as represented by reference 128.

Figure 16B:
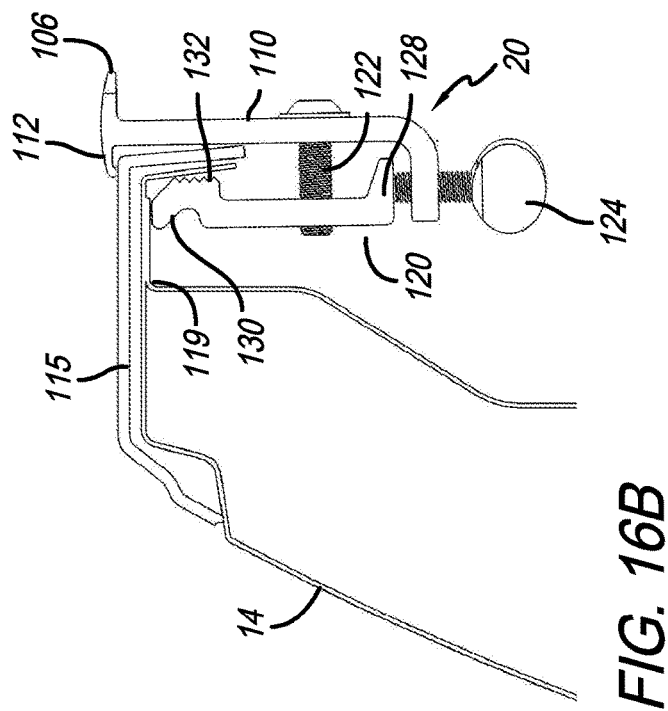
FIG. 16B is another end sectional detail view of the sidewall with clamp assembly attached thereto.
Figure 16A:
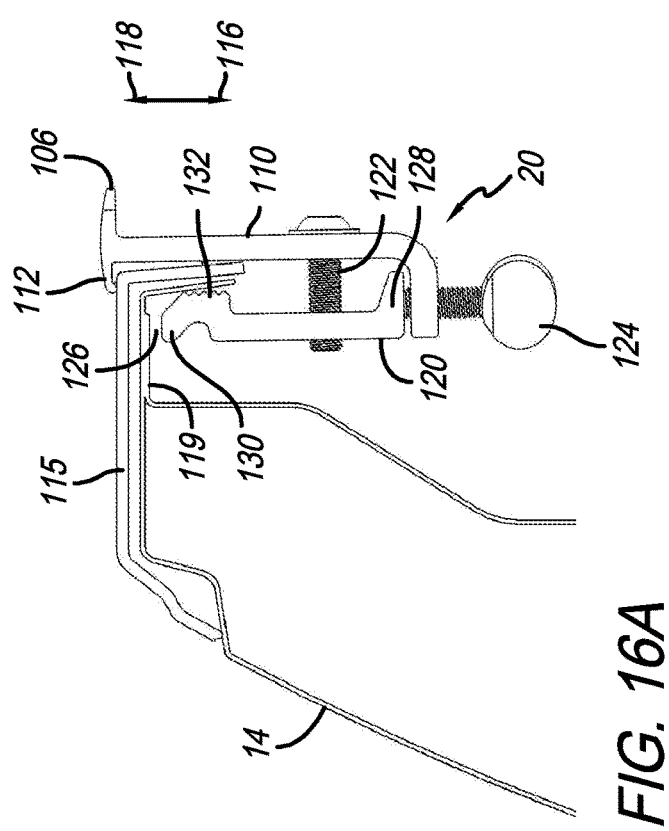
FIG. 16A is another end sectional detail view of the sidewall with clamp assembly attached thereto.

These issues are, thus, ameliorated by clamp assembly 20 as demonstrated in FIGS. 16A and 16B. For example, to eliminate gap 126, adjustment screw 124 may be rotated by hand 42 to apply an upward force against base 128 of clamp back 120 moving same upward in direction 118 so that gap 126 is eliminated as shown in FIG. 16B. It is appreciated that clamping screw 122 may be fitted in a slot formed in clamp base 110 to allow vertical movement of clamp back 120 in directions 116 and 118 as needed. Such a slot would extend in directions 116 and 118 so clamping screw 122 moves vertically with clamp back 120. As also shown in FIG. 16B, gap 126 is now eliminated to provide a better clamping force onto sidewall 14. Likewise, because of the upward force that may be applied against base 128 on clamp back 120 by adjustment screw 124, return flange 112 will move downward in direction 116. This essentially sandwiches the top surface 115 of sidewall 14 between top end 130 of clamp back 120 and return flange 112. Top end 130 is configured to engage bottom surface 119 of a truck bed sidewall such as sidewall 16. Top end 130 prevents any upward movement of clamp assembly 20 in direction 118. When truck bed cover 2—particularly section 8—is moved to its open position with either pinch latch assembly 18 or 19 engaged with catch 106, an upward force may be exerted onto clamp assembly 20. This upward force in direction 118 may cause clamp assembly 20 to move upward as well helping prevent improper engagement.

At the same time, clamping screw 122 may draw clamp back 120 towards clamp base 110 (in direction 36) to provide another securement point on sidewall 14 between clamp back 120 and clamp base 110, as illustratively shown. The clamping force produced by adjustment screw 124 prevents clamp base 110 from moving in directions 116 or 118. The clamping force produced by clamping screw 122 prevents clamp base 110 from moving in directions 34 or 36 (see FIG. 12A). In combination, this securely holds the clamp base 110 and catch 106 in the proper location to provide for a consistent engagement between catch 106 and the pinch latch assembly. It is also understood that these features, when clamping in both the 118/116 and 34/36 directions, can be used to hold a clamp slot rail 162 in a proper location (see, also, FIG. 21). In this illustrative embodiment, clamp back 120 may include gripping surfaces 132 that assist holding clamp 20 onto sidewall 14. It will be appreciated by the skilled artisan upon reading this disclosure that the foregoing description with respect to the clamping operation between clamp assembly 20 and sidewall 14, equally applies to clamp assembly 20 that would clamp onto sidewall 16.

Another illustrative embodiment of the present disclosure provides an adjustable catch. Under certain circumstances, with varying shapes and sizes of pickup truck sidewalls, the vertical and horizontal adjustments that are available with clamp assembly 20 as demonstrated in FIGS. 16A and 16B may potentially affect proper alignment between a catch and latch member to hold the truck bed cover down in a latched position. In other words, the catch might not align with the latch member.

Figure 18B:
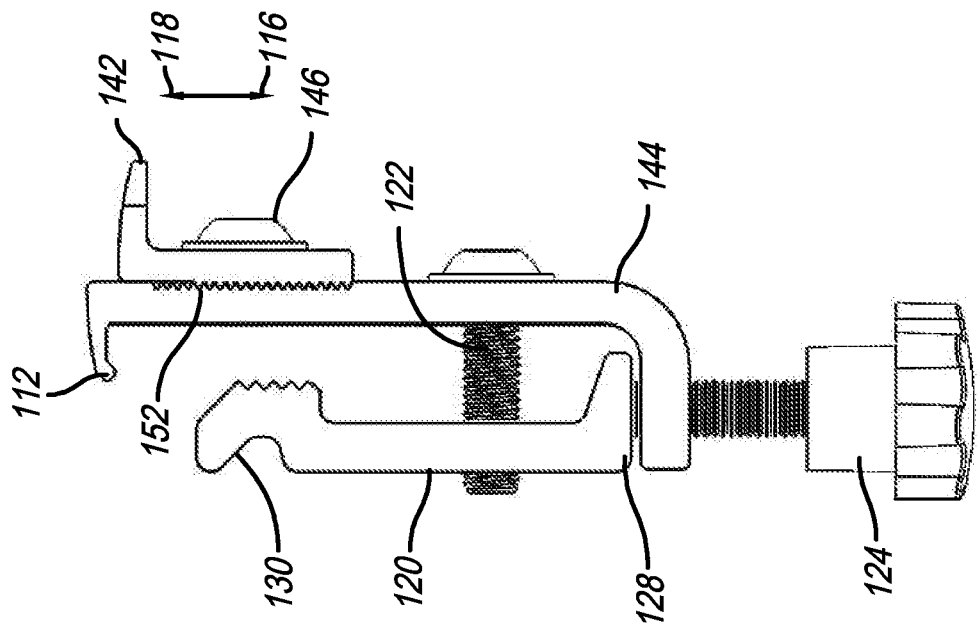
FIG. 18B is another end view of the clamp assembly.
Figure 18A:
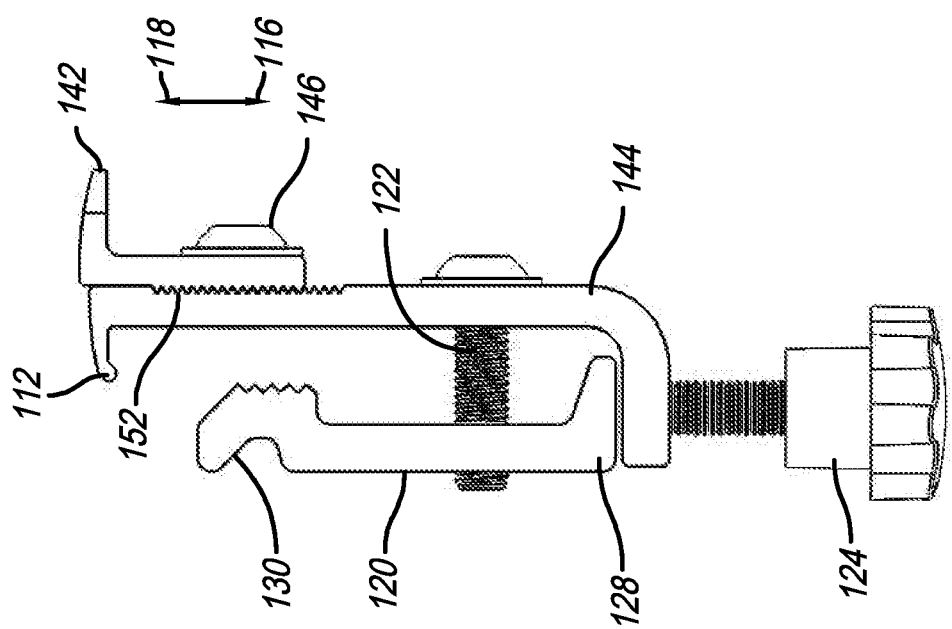
FIG. 18A is another end view of the clamp assembly.

Accordingly, the end and perspective views of clamp assembly 140 of FIGS. 17A and 17B show an adjustable catch plate 142 that is movable in directions 116 and 118 relative to clamp base 144. It is appreciated that clamp back 120, clamping screw 122, and adjustment screw 124 may operate the same as that shown with respect to clamp assembly 20. In this present embodiment, however, adjustable catch plate 142 that may include adjustment fastener 146, is disposed through a slot 148 in adjustable catch plate 142 and secured in a threaded bore 150 in clamp base 144. By tightening or loosening adjustment fastener 146, adjustable catch plate 142 may be either moved or secured onto clamp base 144. Complementary serrated edges 152, both on adjustable catch plate 142 and clamp base 144, may provide further securement between the two structures, as well as modular incremental adjustment between same. Accordingly, and as shown in the end views of FIGS. 18A, adjustment fastener may be loosened to raise adjustable catch plate 142 in direction 118 if such is necessary to engage a latch member, such as latch members 26 or 27. Conversely, as shown in FIG. 18B, adjustable catch plate 142 may be lowered in direction 116 if such is necessary for proper engagement with either latch members 26 or 27. Once proper placement is identified, adjustment fastener 146 may be tightened to fixedly secure adjustable catch plate 142 onto clamp base 144.

Figure 19:
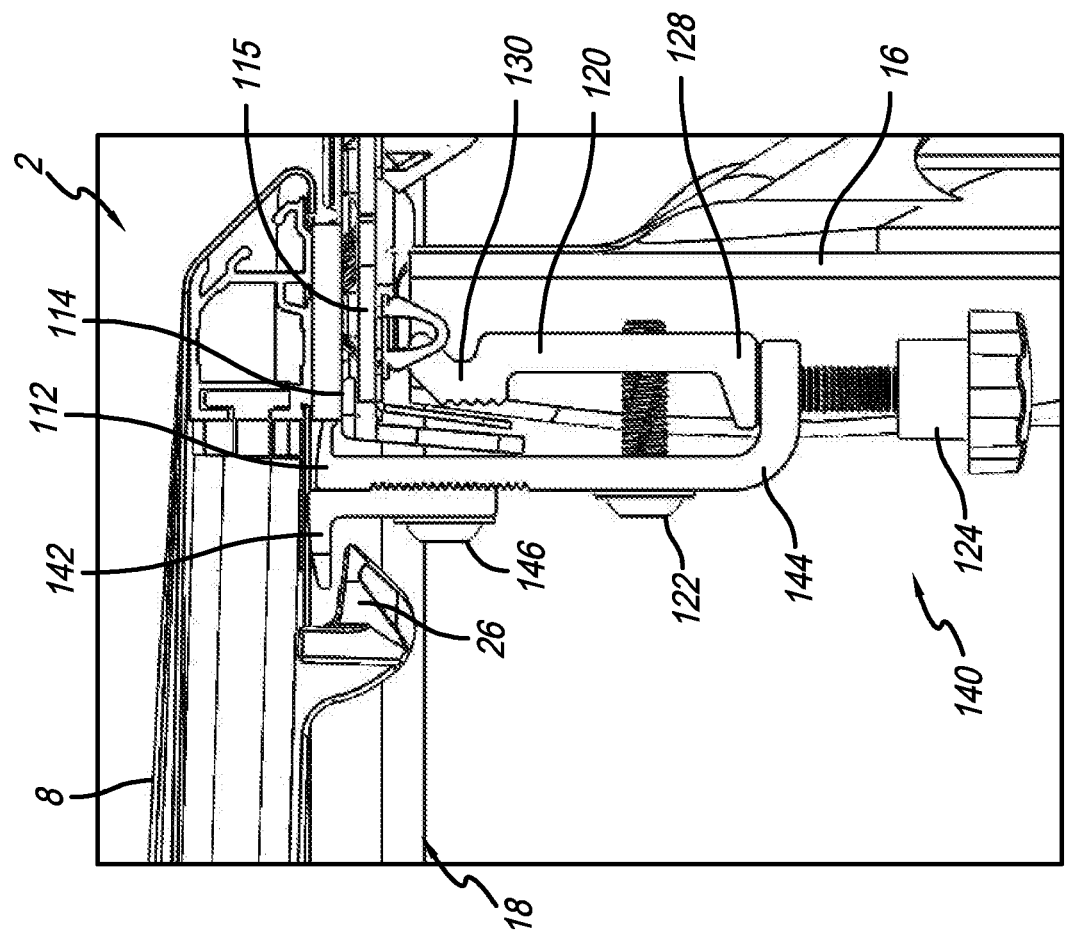
FIG. 19 is another end detail view of the sidewall with the clamp assembly attached thereto.

As shown in the detail end view of FIG. 19, latch member 26 may engage adjustable catch plate 142 when it is raised above return flange 112 on clamp base 144 as shown. Here, return flange 112 engages top surface 115 to help secure clamp assembly 140 onto sidewall 16 while at the same time allow adjustable catch plate 142 to properly engage latch member 26 when same is in its latched position. It will be appreciated by the skilled artisan that the foregoing descriptions, with respect to clamp assembly 140, apply the same to sidewall 14 and latch number 27.

Figure 20:
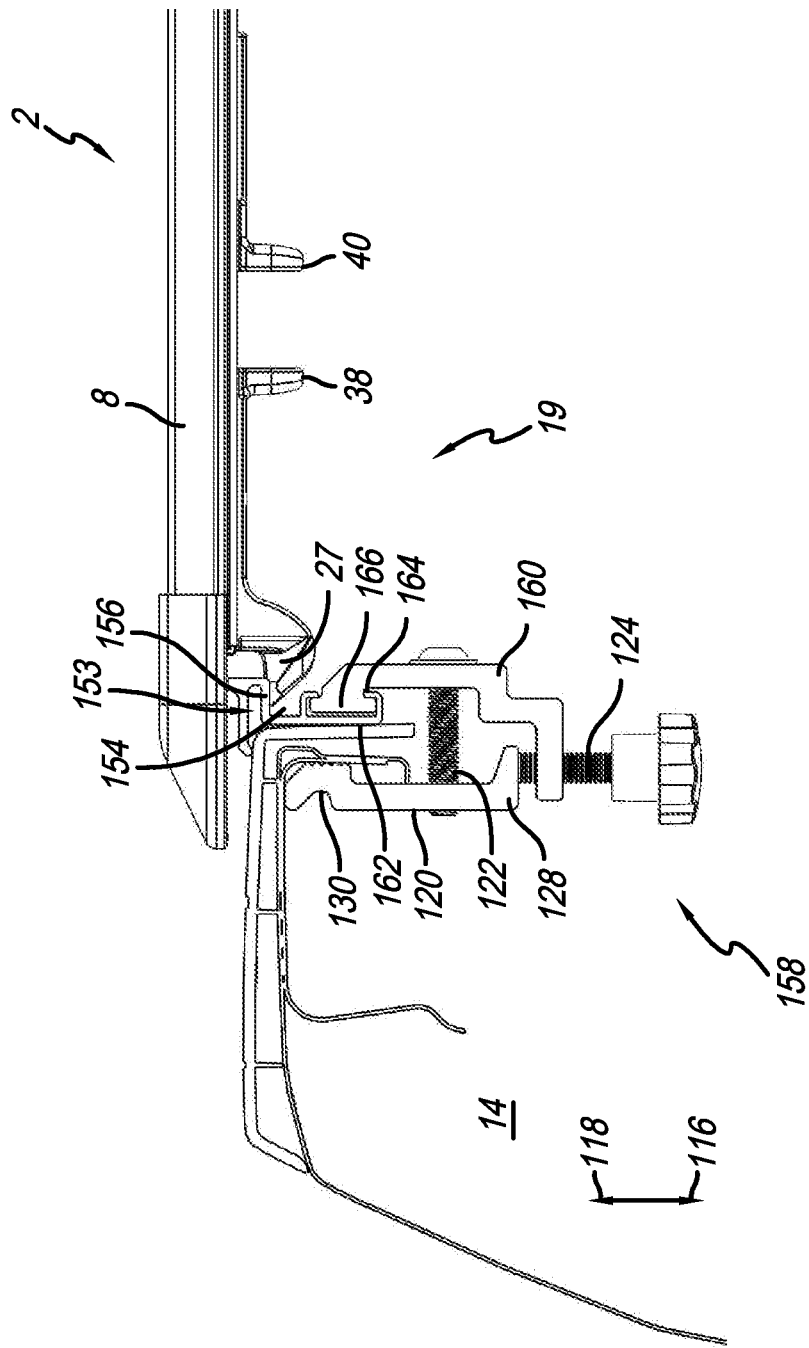
FIG. 20 is another end detail view of a sidewall with a clamp assembly attached thereto.

Another illustrative embodiment of the present disclosure provides a pinch latch rail 153 configured to engage the foregoing pinch latch assemblies 18 and 19. In this illustrative embodiment, a rail, such as pinch latch rail 153, is configured to extend along at least a portion of the longitudinal extent of sidewalls 14 and 16 in order to engage pinch latch assemblies 18 and 19. Shown in the end detail view of FIG. 20, pinch latch assembly 19 of truck bed cover 2, engages recessed slot 154 formed in pinch latch rail 153. In particular, latch member 27 is received in recessed slot 154 so that it is engageable with catch portion 156 of recessed slot 154. It is appreciated that catch portion 156 operates similarly to catch 106 associated with prior embodiments. Also distinguishable is clamp assembly 158 which includes a new clamp base 160. Illustratively, pinch latch rail 153 may include a clamp slot rail 162 having an opening 164, configured to receive a clamp mount 166 to secure clamp assembly 158 onto pinch latch rail 153. Other structures of clamp assembly 158 may be similar to that of clamp assemblies 140 and 20. For instance, clamp back 120 may be coupled to clamp base 160 via clamping screw 122 similar to the prior embodiments. Also, adjustment screw 124 may act on base 128 of clamp back 120 to move same vertically in directions 116 and 118 to provide the clamping functions as previously described with respect to clamp back 120 of clamp assemblies 20 and 140.

Figure 21:
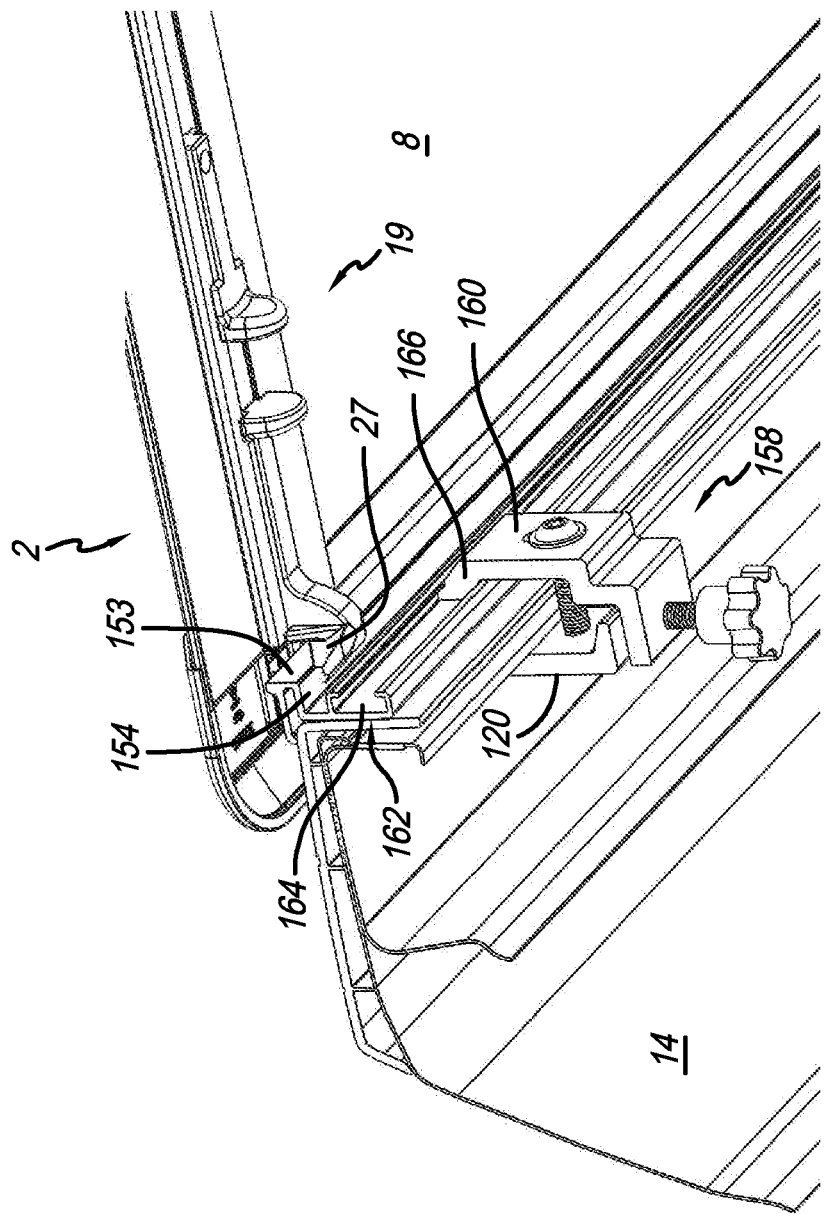
FIG. 21 is an underside perspective detail view of the pinch latch rail coupled to the pinch latch assembly.

The underside perspective detail view of pinch latch rail 153 coupled to pinch latch assembly 19 is shown in FIG. 21. This view further exemplifies how pinch latch assembly 19 which is attached to section 8 of truck bed cover 2 has latch 27 that engages recess slot 154. Also shown herein is clamp slot rail 162 with opening 164 configured to receive clamp mount 166 of clamp base 160 (see, also, FIG. 20).

Underside perspective views showing a portion of truck bed cover 2 and sidewall 16 is shown in FIGS. 22A and 22B. Here, pinch latch rail 153, is shown located on sidewall 16 with clamp assembly 158 spaced apart. In an illustrative embodiment, clamp slot rail 162 may include a cutout notch 168 configured to receive clamp mount 166 of clamp base 160 of clamp assembly 158. A skilled artisan will appreciate, upon reviewing this disclosure, that cutout notch 168 will be sized sufficiently to receive clamp mount 166 when same is moved in direction 118 through cutout notch 168. Thereafter, clamp assembly 158 may be moved in either direction 34 or 36 so clamp mount 166 will be received in clamp slot rail 162. The particular view in FIG. 22B shows clamp mount 166 fitted into clamp slot rail 162. At this point clamp assembly 158 is free to move in either directions 34 and 36 to secure pinch latch rail 153 onto sidewall 16 of the truck.

Pinch Latch Locator

An issue that is sometimes experienced with pickup truck bed covers is their propensity to misalign themselves front to rear on the top of the truck bed sidewalls. This misalignment may allow open space between the truck bed cover and the sidewalls which might allow unintended access to inside the truck bed. This may also move the latch assembly 18 and 19 into a location where they cannot engage with catch portion 156, which would prevent the cover from being properly affixed to the truck bed. Accordingly, another illustrative embodiment of the present disclosure provides a front latch locator that engages a pinch latch assembly located proximal to the forward end of the truck bed, located on section 12, and distal from the pinch latch assemblies 18 and 19 located on section 12 of truck bed cover 2, for example. The front latch locator mounts onto the rail secured to the sidewall and holds a latch that limits lateral movement relative to the front and rear ends of the truck bed cover.

An underside detail view of a portion of Section 12 (see, also, FIG. 1A, 1B, 1C) with a positive set pinch latch assembly 170 having a positive set latch 172 disposed in a front latch locator 174 installed on rail 153 is shown in FIG. 23. Here, positive set latch 172 prevents section 12 of truck bed cover 2 from being movable in either direction 176 or 178 while independent of the other side of section 12 moving in directions 176 or 178. If section 12 of truck bed cover 2 is able to move in directions 176 or 178 on a first side that is located on sidewall 14 independent of movement on a second side of section 12 located on sidewall 16, truck bed cover 2 may end up misaligned as previously identified. Positive set latch 172 fitted into front latch locator 174 as shown, assists in mitigating the risk of truck bed cover 2 moving in directions 176 and 178. Illustratively, positive set latch 172 has a wider girth than a typical latch and fits into a complementarity sized notch 180. A rigid structural connection is thus made between truck bed cover 2 and sidewall 14 (as well as sidewall 16 on the other side of truck bed cover 2) which helps truck bed cover 2 resist shifting and misaligning with respect to the truck bed 4.

Figure 24:
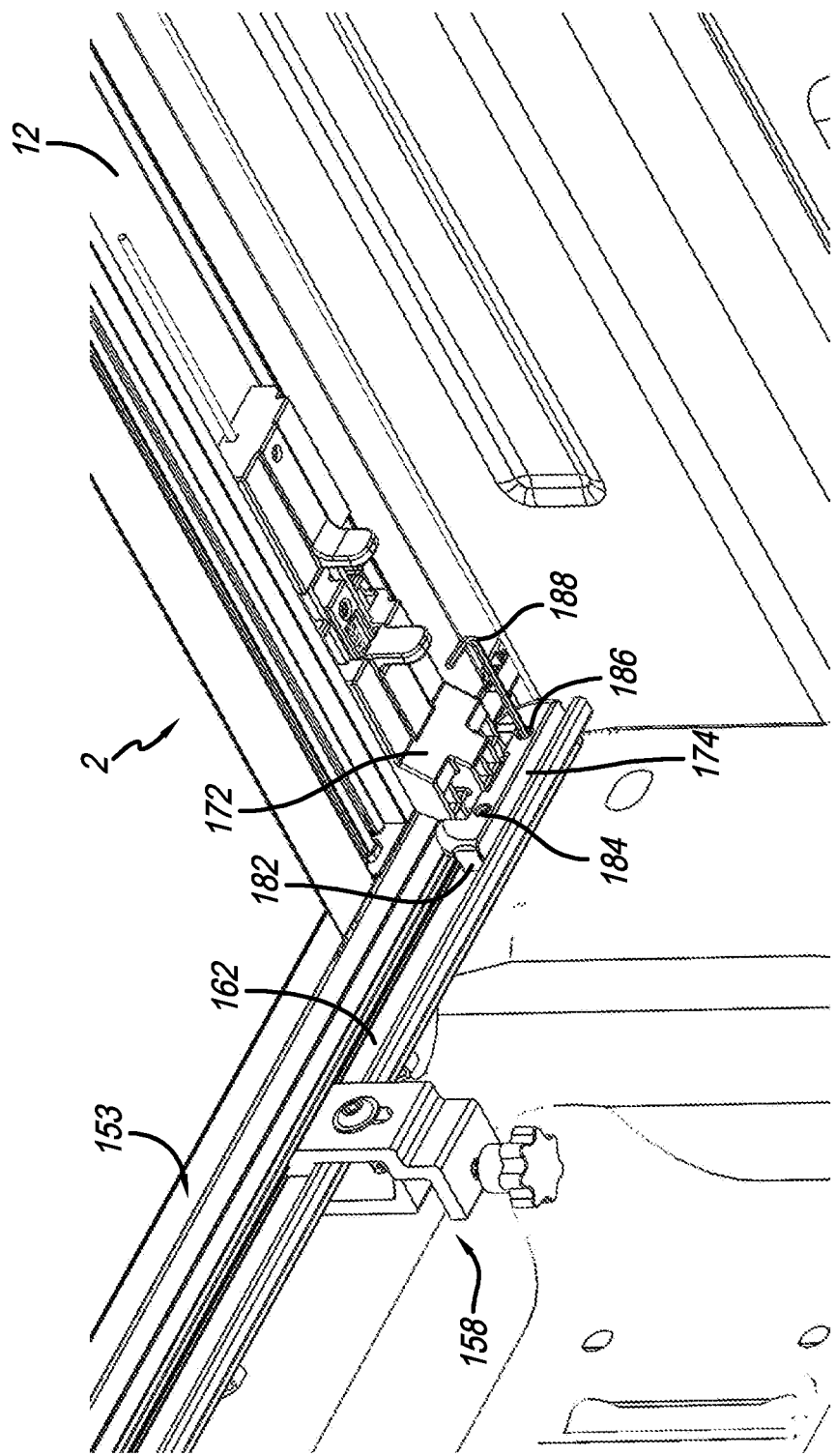
FIG. 24 is another underside perspective view of the section of the truck bed having the positive set pinch latch fitted into the front latch locator.

A similar underside perspective view of section 12 of truck bed 2 having positive set latch 172 fitted into front latch locator 174 is shown in FIG. 24. This view demonstrates how front latch locator 174 is adjustable along pinch latch rail 153. The skilled artisan will appreciate upon reading the present disclosure that front latch locator 174 may be reconfigured to couple to rails of other configuration as well. In the present embodiment, front latch locator 174 includes a rail mount 182 that fits in clamp slot rail 162. To fixedly attach front latch locator 174 to pinch latch rail 153, illustratively, securement fasteners 184 and 186 may be disposed through front latch locator 174 as shown to create a press or interference fit that selectively fixes front latch locator 174 to pinch latch rail 153. As further shown herein, a tool 188 such as an Allen wrench may be used to loosen or tighten the securement fasteners to release or fix front latch locator 174 from or to pinch latch rail 153. It will be appreciated that other selective fixture mechanisms may be employed to allow selective adjustability and to securely fix front latch locator 174 onto pinch latch rail 153 or other rail. It is further appreciated that this adjustability of front latch locator 174 along rail 153 in directions 176 and 178 provides sufficient adjustability to permit front latch locator 174 to be positioned in a desired location to ensure a secure fit with positive set latch 172. Having secure attachment between rail 153 and front latch locator 174, along with secure attachment between front latch locator 174 and positive set latch 172, substantially lessens the likelihood that section 12 and hence truck bed cover 2 will shift or misalign with respect to sidewalls 14 and 16. In other words, truck bed cover 2 will remain square to truck bed 4.

Auto Latch

Referring back to the perspective views of truck bed cover 2, shown on truck bed 4 of pickup truck 6 in FIGS. 1A, 1B, and 1B, demonstrates how sections 8, 10, and 12 both lie on sidewalls 14 and 16 of truck bed 4. The views also show how sections 8, 10, and 12 fold up to allow access to truck bed 4. And, as previously discussed, pinch latch assemblies 18 and 19 operate to selectively hold or release section 8 onto sidewalls 14 and 16. Likewise, positive set latch 172 and front latch locator 174 (see FIGS. 23 and 24) secure section 12 onto sidewalls 14 and 16. Section 10, located between sections 8 and 12 will, to some extent, be fixed on sidewalls 14 and 16 by virtue of section's 8 and 12 securement. In some instances, however, section 10 may not itself be fixed securely onto sidewalls 14 and 16 because there is no positive securement mechanism to do so. Accordingly, an illustrative embodiment of the present disclosure provides an auto latch assembly that secures adjoining sections of the truck bed cover to the sidewalls of the truck bed sidewalls when those sections are lying flat, but releases the adjoining covers from the sidewalls when one section is pivoted upwardly with respect to the other section.

Figure 25:
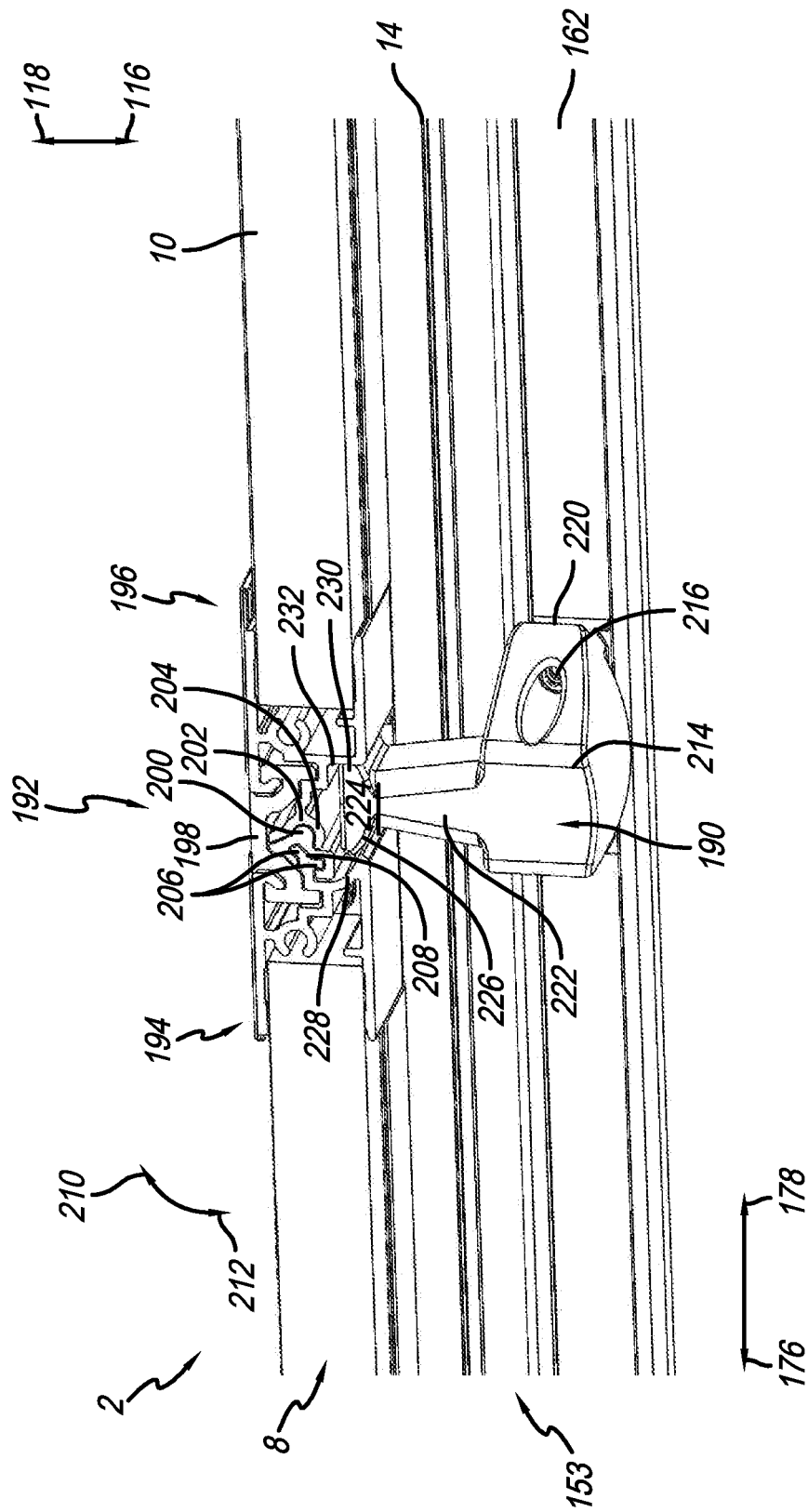
FIG. 25 is a detail cross-sectional view of a portion of the truck bed cover located on the sidewall.

For example, a detail cross-sectional view of a portion of truck bed cover 2 located on sidewall 14 is shown in FIG. 25. This view also shows an auto latch 190 coupled both to rail 153 and a hinge assembly 192. Illustratively, hinge assembly 192 includes hinge portions 194 and 196. Hinge portion 194 is illustratively coupled to section 8 of truck bed cover 2, whereas hinge portion 196 is coupled to section 10 of truck bed cover 2. Both hinge portions 194 and 196 face each other as illustratively shown. A hinge seal 198 illustratively couples to both hinge portions 194 and 196. Hinge seal 198 may be made of a flexible material such as silicone, rubber, ethylene propylene diene monomer (EPDM) rubber so that it may bend or flex as one hinge portion moves relative to the other hinge portion (see, e.g., FIGS. 27 and 28). A hinge member 200 is also located between hinge portions 194 and 196. Illustratively, hinge member 200 may be made of a plastic such as acrylonitrile butadiene styrene (ABS) and may extend through the length of the hinge portions which themselves may extend the width of the truck bed sections. As shown herein, hinge 200 includes a tab 202 that is fitted into a receptacle 204 formed in hinge portion 196. Hinge member 200 is also secured to hinge portion 194 via flange members 206 that fit in correspondingly sized cavities 208 formed in hinge member 200. Also as shown, hinge member 200 sits under hinge seal 198. It is appreciated that hinge seal 198 helps keep water and other contaminants out of hinge assembly 192. Illustratively, as section 8 pivots with respect to section 10 in direction 210, tab 202 of hinge member 200 may pull out of receptacle 204 to allow sections 8 and 10 to move with respect to each other. Because hinge seal 198 is flexible as previously discussed, section 8 is able to fold over section 10.

Figure 26:
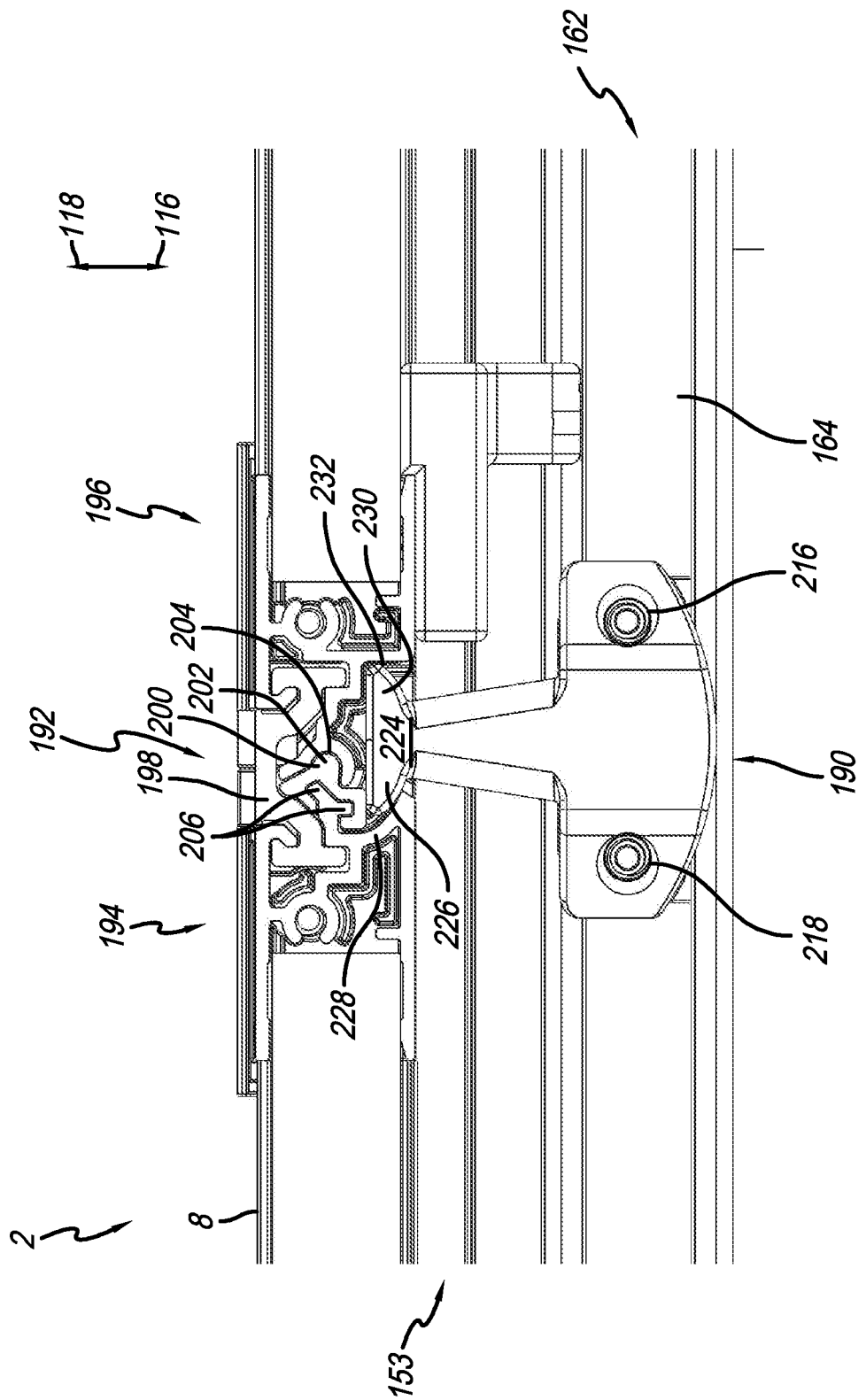
FIG. 26 is another detail cross-sectional view of a portion of the truck bed cover located on the sidewall.

Also shown in FIG. 25 is auto latch 190. This structure includes a base 214 that is selectively connectible to rail 152. Illustratively, fastener 216 attaches to rail mount 220 whereby loosening or tightening fastener 216 (as well as fastener 218 as shown in FIG. 26) allows the auto latch 190 to move in directions 176 or 178 to properly align with the hinges of adjoining sections of truck bed cover 2. Extending illustratively upward from base 214 is arm 222 that terminates in a head 224 located distal from base 214. Illustratively, arcuate edge 226 of head 224 is configured to engage a corresponding arcuate receptacle 228 in hinge portion 194. Opposite edge 226 of head 224 is flange member 230 which abuts surface 232 of hinge portion 196 as illustratively shown. It is this auto latch 190 that inhibits sections 8 and 10, for example, to both be raised together from sidewall 14 (as well as sidewall 16 on the other side of truck bed cover 2) in direction 118.

Figure 27:
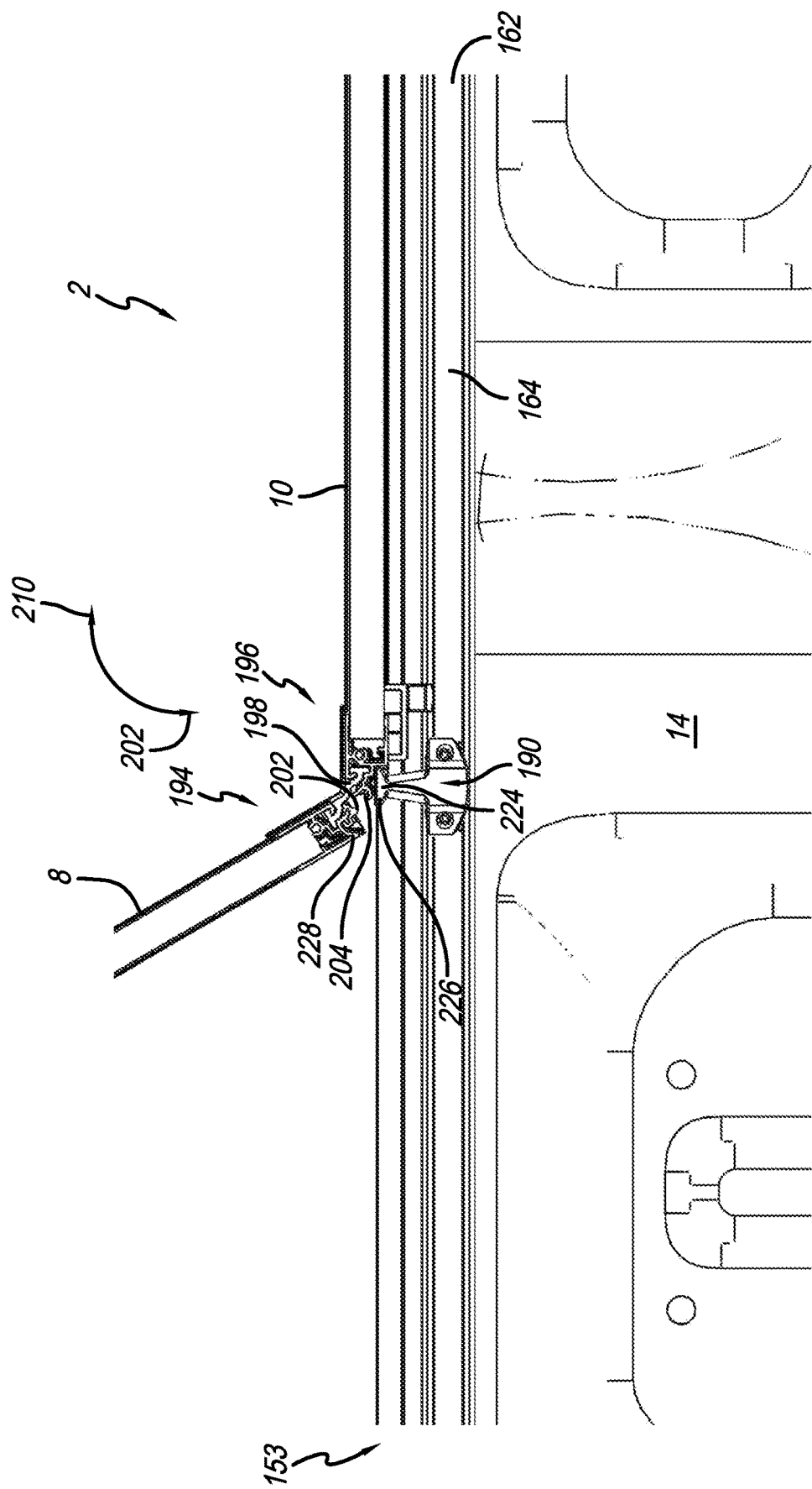
FIG. 27 is another detail cross-sectional view of a portion of the truck bed cover located on the sidewall.
Figure 28:
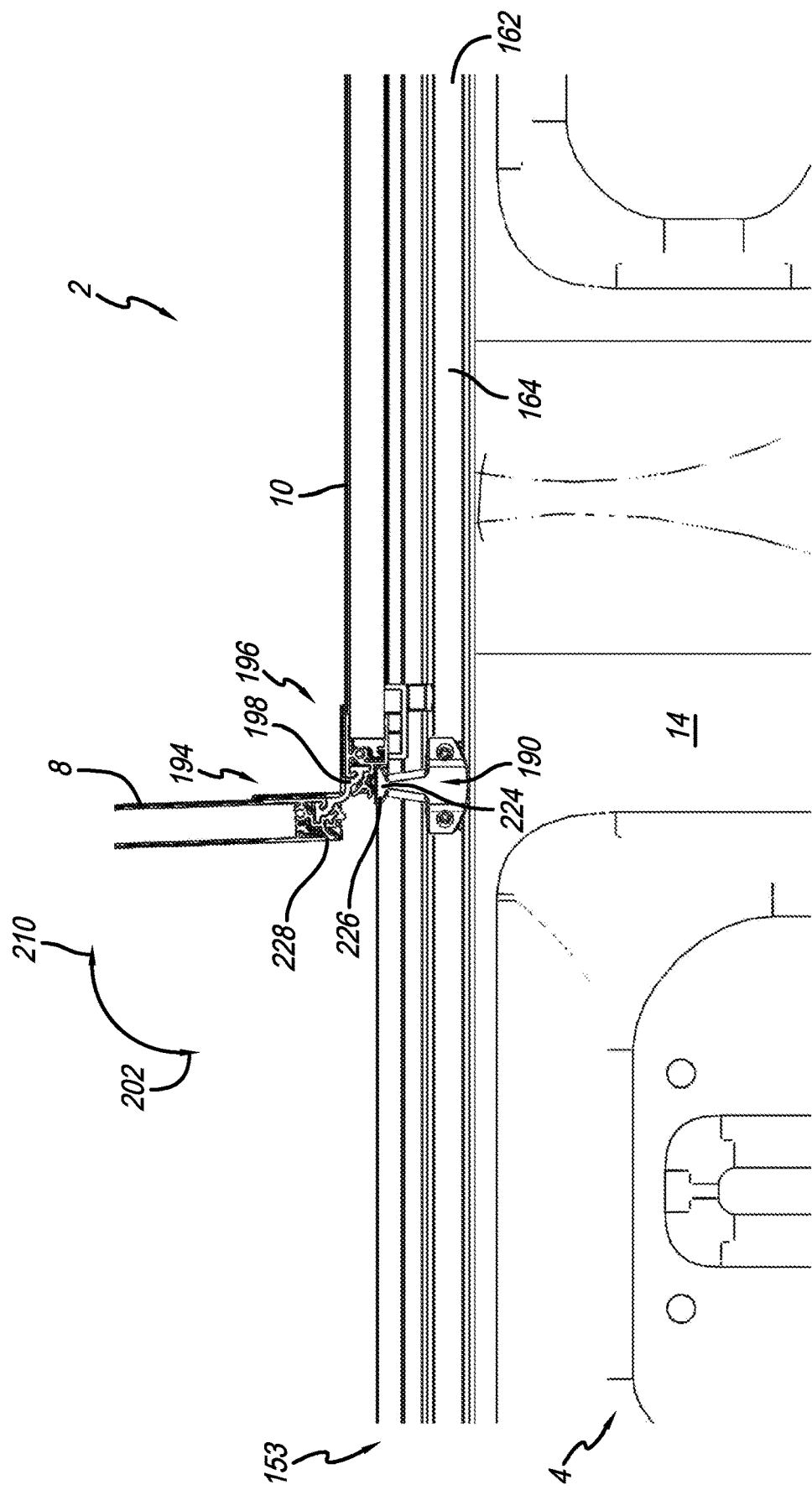
FIG. 28 is another detail cross-sectional view of a portion of the truck bed cover located on the sidewall.

Cross-sectional side views of truck bed cover 2 demonstrate the use of auto latch 190 attached to rail 153 on sidewall 14 in the progression of views of FIGS. 26, 27, and 28. These views depict how one section, such as section 8 may be pivoted with respect to an adjoining section 10 to lift the sections from auto latch 190 despite being able to hold both sections 8 and 10 in place while they are level.

As shown in FIG. 26, auto latch 190 is in the same position with respect to hinge assembly 192 as shown FIG. 25. Here, hinge member 200 is fitted in receptacle 204 of hinge portion 196. Also, edge 226 of head 224 is engageable with arcuate receptacle 228 of hinge portion 194. In this configuration, attempting to raise both sections 8 and 10 will not be possible because edge 226 will engage arcuate receptacle 228 providing an obstruction to any concurrent movement of sections 8 and 10. Also, because hinge portion 194 is in close proximity of hinge portion 196—holding hinge portion 194 will prevent hinge portion 196 from moving as well. As a result, sections 8 and 10 will remain secure on sidewall 14 (as well as sidewall 16 on the other side of truck bed cover 2) while both sections 8 and 10 are lying flat.

The same view as shown in FIG. 26 is also shown in FIG. 27. The difference is that section 8 of truck bed cover 2 has been pivoted in direction 210 in the upward direction as shown. Because section 10 is not being moved, edge 226 of head 224 from auto latch 190 does not serve as an obstruction to arcuate receptacle 228 of hinge portion 194. In other words, arcuate receptacle 228 is shaped such that a pivoting movement in direction 210 shown may be lifted away from an edge 226 of head 224. By arcuate receptacle 228 extricating itself from head 224, no obstruction exists preventing section 8 from pivoting. Also shown in this view is tab 202 of hinge member 200 exiting receptacle 204 by pivoting section 8 upward relative to section 10 as shown. Further, this view demonstrates how hinge seal 198 being made of flexible material will deform while section 12 pivots with respect to section 10.

The view shown in FIG. 28 is similar to that shown in FIGS. 26 and 27, except that section 8 has pivoted further in direction 210 with respect to section 10. This view shows that hinge seal 198 further deforms to allow the relative movement between the sections. Also appreciated in this view is that no other obstruction exists between head 224 of auto latch 190 and hinge portion 196. This means that section 10 may now be pivoted in direction 210, as well as independent of the movement of section 12. This allows the sections to be folded over each other such as that shown in FIG. 1A. It is also appreciated that when unfolding sections 8 and 10, by pivoting same in direction 212, hinge portion 196 will fit over top head 224 of auto latch 190. Subsequently, section 10 may be pivoted in direction 212 until edge 226 of head 224 reengages arcuate receptacle 228 of hinge portion 194 to again secure sections 8 and 10 onto sidewall 14 of truck bed 4. Additionally tab 202 of hinge member 200 will reinsert itself into receptacle 204 creating a positive connection between sections 8 and 10.

Figure 29:
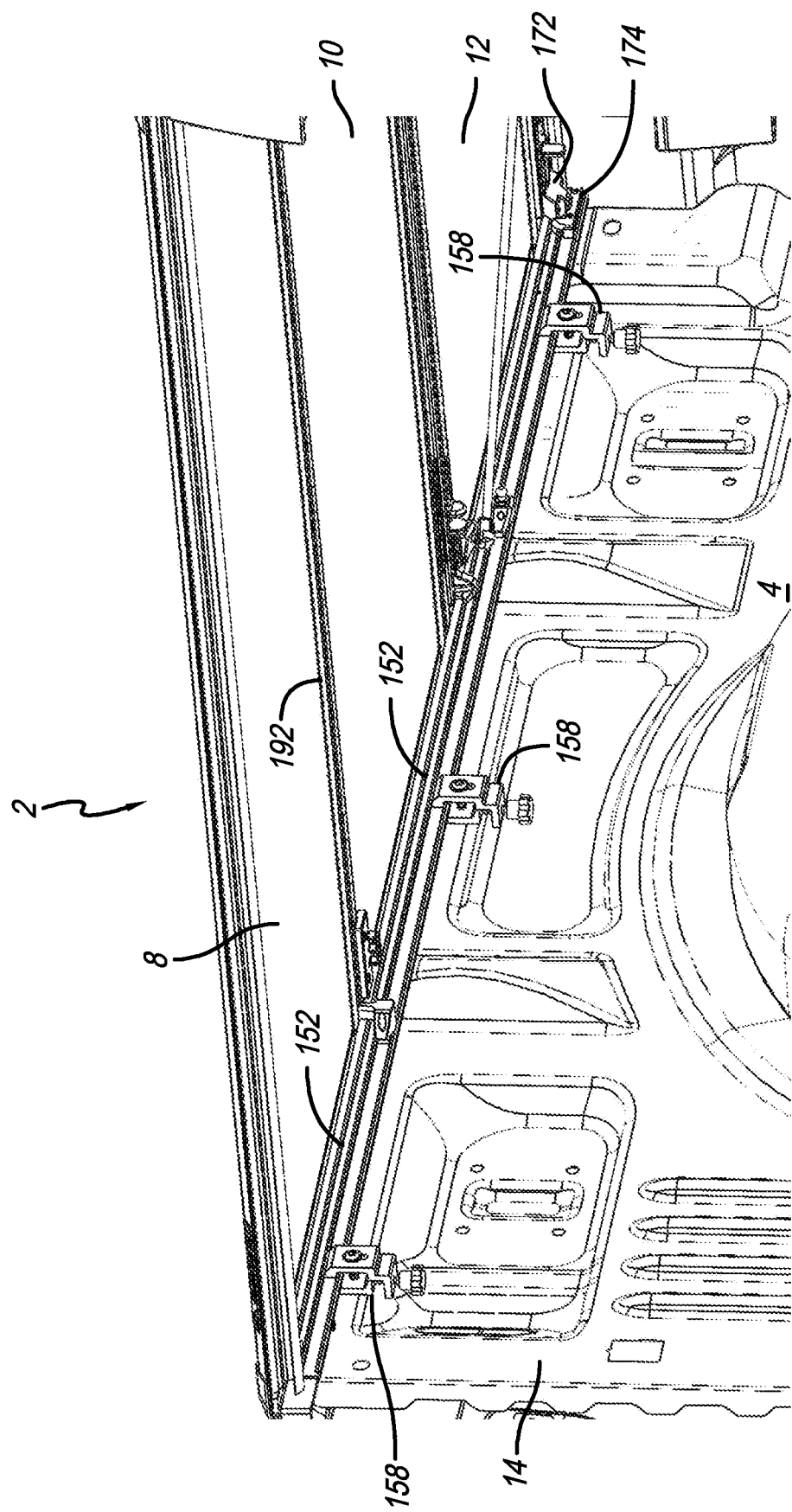
FIG. 29 is a perspective underside view of a portion of the truck bed showing the truck bed cover located over the sidewall.

A perspective underside view of a portion of truck bed 4 showing truck bed cover 2 located over sidewall 14 is shown in FIG. 29. Here, it will be appreciated how pinch latch rail 153 is secured onto sidewall 14 via clamp assemblies 158. Auto latch 190 and a front latch locator 174 are also attached to pinch latch rail 153. Auto latch 190 is shown coupling to hinge portion 192 located between sections 8 and 10 (see, also FIGS. 25 through 28). Pinch latch assembly 19 is shown engaged to catch portion 156 of pinch latch rail 153. Also, positive set latch 172 attached to section 12 engages front latch locator 174 to prevent misalignment of truck bed cover 2 with respect to sidewalls 14 and 16 (see also FIGS. 23 and 24).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application, the disclosure from this non-provisional patent application controls.

What is claimed is:

1. A tonneau cover for use on a truck bed of a pickup truck, the tonneau cover comprising:
   at least one covering configured to span at least a portion of the truck bed the pickup truck;
   at least one clamp assembly configured to selectively couple at least a portion of the tonneau cover to at least one sidewall of the truck bed, the at least one clamp assembly comprising:
   a clamping screw that includes a head and a threaded body;
   an adjustment screw that includes a head and a threaded body;
   a clamp back that includes a base extending therefrom and a top end spaced apart from the base;
   wherein the clamp back also includes a clamping screw bore disposed there through to receive a portion of the threaded body of the clamping screw;
   a clamp base that includes a clamping screw slot disposed there through to receive another portion of the threaded body of the clamping screw such that the clamping screw is movable along the clamping screw slot when the at least one clamp assembly is in an unclamped position;
   wherein the clamp base also includes an adjustment screw bore opposite the base of the clamp back;
   wherein the threaded body of the adjustment screw is disposed through the adjustment screw bore of the clamp base at an orientation that is transverse to the clamping screw, and wherein the adjustment screw is engageable with the base of the clamp back to move the clamp back with respect to the clamp base; and
   wherein the portion of the threaded body of the clamping screw that moves the clamp back relative to the clamp base is at another orientation that is transverse to the orientation of the adjustment screw.

2. The tonneau cover of claim 1, wherein the clamping screw bore disposed through the clamp back has a threaded periphery that complements the threaded body of the clamping screw to couple the clamp back to the clamping screw.

3. The tonneau cover of claim 2, wherein the adjustment screw bore disposed through the clamp base has a threaded periphery that complements the threaded body of the adjustment screw to couple the clamp base to the adjustment screw.

4. The tonneau cover of claim 1, wherein the clamp base includes a latch catch that extends from the clamp base and is configured to be engageable with a latch member on the tonneau cover.

5. The tonneau cover of claim 1, wherein the clamp base includes a catch plate that is movable relative to the clamp base, wherein the catch plate includes a latch catch that extends from the catch plate and is configured to be engageable with a latch member on the tonneau cover.

6. The tonneau cover of claim 5, wherein the catch plate is movable transverse to the orientation of the clamping screw.

7. The tonneau cover of claim 6, wherein the catch plate includes a catch plate slot and the clamp base includes a catch plate bore, wherein a fastener is extendable through the catch plate slot and couples to the catch plate bore to allow the catch plate to be selectively movable with respect to the clamp base.

8. The tonneau cover of claim 5, wherein the catch plate includes a plurality of serrated edges and the clamp base includes a plurality of complementary serrated edges, wherein one or more of the plurality of serrated edges of the catch plate is engageable with one or more of the plurality of complementary serrated edges of the clamp base.

9. The tonneau cover of claim 1, wherein the at least one clamp assembly further includes a second clamping screw that has a head and a threaded body, wherein the clamp back also includes a second clamping screw bore spaced apart from the clamping screw bore and disposed through the clamp back to receive a portion of the threaded body of the second clamping screw, wherein the clamp base includes a second clamping screw slot disposed there through and spaced apart from the clamping screw slot such that the second clamping screw is movable along the second clamping screw slot when the at least one clamp assembly is in the unclamped position.

10. The tonneau cover of claim 4, wherein the clamp base includes a return flange extending opposite from the latch catch.

11. The tonneau cover of claim 1, further comprises at least one longitudinally extending rail with a clamp slot formed thereon, wherein the at least one covering is configured to be movable relative to at least a portion of the at least one longitudinally extending rail, wherein the clamp base includes a clamp mount spaced apart from the adjustment screw.

12. The tonneau cover of claim 11, wherein the clamp mount includes at least one clamp mount flange extending there from to engage the clamp slot formed on the at least one longitudinally extending rail.

13. The tonneau cover of claim 12, wherein the at least one clamp mount flange of the clamp mount extends upwardly with respect to the at least one longitudinally extending rail.

14. The tonneau cover of claim 12, wherein the at least one clamp mount flange of the clamp mount extends upwardly with respect to the at least one longitudinally extending rail and within the clamp slot, and wherein the at least one clamp mount flange includes a second clamp mount flange that extends from the clamp mount opposite the at least one clamp mount flange within the clamp slot.

15. A tonneau cover for use on a truck bed of a pickup truck, the tonneau cover comprising:
   at least one covering configured to span at least a portion of the truck bed the pickup truck;
   at least one clamp assembly configured to selectively couple at least a portion of the tonneau cover to at least one sidewall of the truck bed, the at least one clamp assembly comprising:
   an adjustment screw that includes a head and a body;
   a clamp back; and
   a clamp base;
   wherein the clamp base also includes an adjustment screw bore; and
   wherein the body of the adjustment screw is disposed through the adjustment screw bore of the clamp base and is engageable with the clamp back to move the clamp back substantially parallel with respect to the clamp base.

16. The tonneau cover of claim 15, wherein the clamp back includes a base extending therefrom, wherein the adjustment screw is engageable with the base of the clamp back.

17. The tonneau cover of claim 15, wherein the at least one clamp assembly further comprises a clamping screw that includes a head and a body, wherein the clamp back also includes a clamping screw bore disposed through the clamp back to receive a portion of the body of the clamping screw, wherein the clamp base includes a clamping screw slot disposed there through to receive another portion of the body of the clamping screw such that the clamping screw is movable along the clamping screw slot when the at least one clamp assembly is in an unclamped position.

18. The tonneau cover of claim 17, wherein the body of the adjustment screw is disposed through the adjustment screw bore of the clamp base at an orientation that is transverse to the clamping screw.

19. A tonneau cover for use on a truck bed of a pickup truck, the tonneau cover comprising:
- at least one covering configured to span at least a portion of the truck bed the pickup truck;
- at least one clamp assembly configured to selectively couple at least a portion of the tonneau cover to at least one sidewall of the truck bed, the at least one clamp assembly comprising:
  - a clamp back; and
  - a clamp base;
  - wherein the clamp back is selectively positionable in a clamped and unclamped position with respect to the clamp base;
  - wherein the clamp back is also selectively positionable with respect to the clamp base at positions that are transverse to movement of the clamp back and the clamp base between the clamped and unclamped positions;
  - wherein the clamp back is spaced apart from the clamp base; and
  - an adjustment screw that engages the clamp back through the clamp base and supports the clamp back relative to the clamp base.

* * * * *